United States Patent
Zhang et al.

(10) Patent No.: US 11,831,387 B2
(45) Date of Patent: Nov. 28, 2023

(54) FULL DUPLEX DEFAULT BEAM FOR WIRELESS COMMUNICATION

(71) Applicant: QUALCOMM Incorporated, San Diego, CA (US)

(72) Inventors: Qian Zhang, Basking Ridge, NJ (US); Yan Zhou, San Diego, CA (US); Junyi Li, Fairless Hills, PA (US); Navid Abedini, Basking Ridge, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 119 days.

(21) Appl. No.: 17/357,556

(22) Filed: Jun. 24, 2021

(65) Prior Publication Data

US 2022/0416872 A1    Dec. 29, 2022

(51) Int. Cl.
| | |
|---|---|
| H04B 7/08 | (2006.01) |
| H04W 72/23 | (2023.01) |
| H04L 5/14 | (2006.01) |
| H04W 52/14 | (2009.01) |
| H04W 72/044 | (2023.01) |

(52) U.S. Cl.
CPC .............. *H04B 7/088* (2013.01); *H04L 5/14* (2013.01); *H04W 52/143* (2013.01); *H04W 72/046* (2013.01); *H04W 72/23* (2023.01)

(58) Field of Classification Search
CPC ........ H04B 7/088; H04L 5/14; H04W 52/143; H04W 72/042; H04W 72/046
See application file for complete search history.

(56) References Cited

U.S. PATENT DOCUMENTS

| | | | | |
|---|---|---|---|---|
| 2005/0094583 | A1* | 5/2005 | Gupta | H04L 5/1423 370/201 |
| 2019/0319823 | A1* | 10/2019 | Akkarakaran | H04W 80/02 |
| 2020/0288479 | A1* | 9/2020 | Xi | H04W 72/042 |
| 2021/0105749 | A1 | 4/2021 | Zhou et al. | |

(Continued)

FOREIGN PATENT DOCUMENTS

WO    WO-2019099659 A1    5/2019

OTHER PUBLICATIONS

International Search Report and Written Opinion—PCT/US2022/030584—ISA/EPO—dated Sep. 27, 2022.

*Primary Examiner* — Kiet Tang
(74) *Attorney, Agent, or Firm* — Holland & Hart LLP/Qualcomm Incorporated

(57) ABSTRACT

Methods, systems, and devices for wireless communication are described. A communication device, for example, a user equipment (UE) may select a default beam to use for downlink communication while operating in a full duplex mode. The UE may receive from another communication device, for example, a base station control signaling indicating the default beam for the UE to use for the downlink communication. A default beam (which may also be referred to as a full duplex beam) may be a default downlink beam or a default uplink beam. In some examples, the UE may select a default beam pair to use for downlink communication and uplink communication while operating in the full duplex mode. A default beam pair (which may also be referred to as a full duplex beam pair) may include both a default downlink beam and a default uplink beam.

29 Claims, 16 Drawing Sheets

(56) References Cited

U.S. PATENT DOCUMENTS

2021/0194564 A1    6/2021  Xu et al.
2021/0410172 A1    12/2021 Xu et al.
2022/0302984 A1*   9/2022  Suh .................... H04B 7/0695

* cited by examiner

FULL DUPLEX DEFAULT BEAM FOR WIRELESS COMMUNICATION

FIELD OF TECHNOLOGY

The following relates to wireless communication, including using a full duplex default beam for the wireless communication.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

Various aspects of the present disclosure relate to enabling a communication device, such as a UE, to support use of a full duplex default beam for beamformed wireless communication while operating in a full duplex mode. The communication device may receive control signaling, such as a radio resource control (RRC) message, or a downlink control information (DCI), or a medium access control-control element (MAC-CE), that may indicate a full duplex default beam or a full duplex default beam pair for the communication device to use while operating in the full duplex mode. The communication device may determine or select the full duplex default beam or the full duplex default beam pair based on one or more control resource sets (CORESETs) associated with the control signaling, where a respective CORESET may correspond to the full duplex default beam (or a respective full duplex default beam of the full duplex default beam pair). A full duplex default beam may be a default downlink beam or a default uplink beam, while a full duplex default beam pair may include both the default downlink beam and the default uplink beam. By enabling the communication device to support beamformed wireless communication using one or more of a full duplex default beam or a full duplex default beam pair when operating in the full duplex mode, the communication device may mitigate self-interference issues, among other examples, related to using a half duplex default beam when operating in a half duplex mode.

A method for wireless communication at a UE is described. The method may include selecting a default beam to use for downlink communication while operating in a full duplex mode and receiving the downlink communication based on the default beam in the control signaling.

An apparatus for wireless communication at a UE is described. The apparatus may include a processor, memory coupled with the processor, and instructions stored in the memory. The instructions may be executable by the processor to cause the apparatus to select a default beam to use for downlink communication while operating in a full duplex mode and receive the downlink communication based on the default beam in the control signaling.

Another apparatus for wireless communication at a UE is described. The apparatus may include means for selecting a default beam to use for downlink communication while operating in a full duplex mode and means for receiving the downlink communication based on the default beam in the control signaling.

A non-transitory computer-readable medium storing code for wireless communication at a UE is described. The code may include instructions executable by a processor to select a default beam to use for downlink communication while operating in a full duplex mode and receive the downlink communication based on the default beam in the control signaling.

Some examples of the method, apparatuses, and non-transitory computer-readable medium described herein may further include operations, features, means, or instructions for receiving control signaling indicating the default beam for the UE to use for downlink communication while operating in a full duplex mode and where selecting the default beam to use for the downlink communication while operating in the full duplex mode may be based on the control signaling indicating the default beam.

In some examples of the method, apparatuses, and non-transitory computer-readable medium described herein, receiving the control signaling may include operations, features, means, or instructions for receiving an RRC message indicating the default beam to use for the downlink communication while operating in the full duplex mode.

In some examples of the method, apparatuses, and non-transitory computer-readable medium described herein, receiving the control signaling may include operations, features, means, or instructions for receiving a MAC-CE updating the default beam to use for the downlink communication while operating in the full duplex mode.

In some examples of the method, apparatuses, and non-transitory computer-readable medium described herein, receiving the control signaling may include operations, features, means, or instructions for receiving an indication of a default beam pair to use for one or more of the downlink communication or uplink communication while operating in the full duplex mode, the default beam pair including a default downlink beam and a default uplink beam and where receiving the downlink communication may be based on the default beam pair.

Some examples of the method, apparatuses, and non-transitory computer-readable medium described herein may further include operations, features, means, or instructions for selecting the default beam pair to use for the downlink communication and the uplink communication while operating in the full duplex mode based on an absence of a transmission configuration indicator (TCI) state in one or more symbols associated with the full duplex mode.

Some examples of the method, apparatuses, and non-transitory computer-readable medium described herein may further include operations, features, means, or instructions for receiving a DCI including a DCI field including a bit indicating to enable or disable the default beam pair.

Some examples of the method, apparatuses, and non-transitory computer-readable medium described herein may further include operations, features, means, or instructions for receiving a DCI indicating the same TCI states as the default beam pair associated with the downlink communication and the uplink communication.

In some examples of the method, apparatuses, and non-transitory computer-readable medium described herein, receiving the control signaling may include operations, features, means, or instructions for receiving a second indication of one or more power control parameters associated with the default beam pair and where receiving the downlink communication may be based on the one or more power control parameters.

In some examples of the method, apparatuses, and non-transitory computer-readable medium described herein, the one or more power control parameters includes a nominal power parameter, a power factor parameter, or a closed-loop index parameter.

Some examples of the method, apparatuses, and non-transitory computer-readable medium described herein may further include operations, features, means, or instructions for determining a path loss reference signal identifier associated with one or more uplink channels for the uplink communication based on the control signaling and where transmitting the uplink communication may be based on the path loss reference signal identifier associated with the one or more uplink channels for the uplink communication in the full duplex mode.

Some examples of the method, apparatuses, and non-transitory computer-readable medium described herein may further include operations, features, means, or instructions for determining a path loss reference signal identifier associated with one or more uplink channels for the uplink communication based on an uplink TCI state or an uplink spatial relation information associated with the default beam pair and where transmitting the uplink communication may be based on the path loss reference signal identifier associated with the one or more uplink channels for the uplink communication in the full duplex mode.

Some examples of the method, apparatuses, and non-transitory computer-readable medium described herein may further include operations, features, means, or instructions for selecting the default beam for the downlink communication based on a first duration being less than a second duration, the first duration corresponding to a first period between receiving a physical downlink control channel (PDCCH) to receiving a physical downlink shared channel (PDSCH), the second duration corresponding to a second period between receiving the PDCCH and applying spatial quasi-colocation (QCL) information for the PDSCH.

Some examples of the method, apparatuses, and non-transitory computer-readable medium described herein may further include operations, features, means, or instructions for determining the default beam to use for the downlink communication while operating in the full duplex mode based on a CORESET identifier of a set of multiple CORESET identifiers associated with the full duplex mode and where receiving the downlink communication using the default beam may be based on the determining.

In some examples of the method, apparatuses, and non-transitory computer-readable medium described herein, the set of multiple CORESET identifiers associated with the full duplex mode may be different than a respective set of multiple CORESET identifiers associated with a half duplex mode.

Some examples of the method, apparatuses, and non-transitory computer-readable medium described herein may further include operations, features, means, or instructions for receiving the downlink communication using the default beam may be based on that the CORESET may be configured for a component carrier associated with the default beam.

Some examples of the method, apparatuses, and non-transitory computer-readable medium described herein may further include operations, features, means, or instructions for receiving a DCI, where the DCI excludes one or more of a downlink TCI state or an uplink TCI state while operating in the full duplex mode.

In some examples of the method, apparatuses, and non-transitory computer-readable medium described herein, the default beam to use for the downlink communication while operating in the full duplex mode may be different than a default beam to use for the downlink communication while operating in a half duplex mode.

In some examples of the method, apparatuses, and non-transitory computer-readable medium described herein, the default beam corresponds to a lowest or a highest CORESET identifier of a set of CORESET identifiers.

A method for wireless communication at a base station is described. The method may include selecting a default beam for a UE to use for downlink communication while operating in a full duplex mode, transmitting control signaling indicating the default beam for the UE to use for downlink communication, and transmitting the downlink communication to the UE based on transmitting the control signaling indicating the default beam.

An apparatus for wireless communication at a base station is described. The apparatus may include a processor, memory coupled with the processor, and instructions stored in the memory. The instructions may be executable by the processor to cause the apparatus to select a default beam for a UE to use for downlink communication while operating in a full duplex mode, transmit control signaling indicating the default beam for the UE to use for downlink communication, and transmit the downlink communication to the UE based on transmitting the control signaling indicating the default beam.

Another apparatus for wireless communication at a base station is described. The apparatus may include means for selecting a default beam for a UE to use for downlink communication while operating in a full duplex mode, means for transmitting control signaling indicating the default beam for the UE to use for downlink communication, and means for transmitting the downlink communication to the UE based on transmitting the control signaling indicating the default beam.

A non-transitory computer-readable medium storing code for wireless communication at a base station is described. The code may include instructions executable by a processor to select a default beam for a UE to use for downlink communication while operating in a full duplex mode, transmit control signaling indicating the default beam for the UE to use for downlink communication, and transmit the downlink communication to the UE based on transmitting the control signaling indicating the default beam.

Some examples of the method, apparatuses, and non-transitory computer-readable medium described herein may further include operations, features, means, or instructions for transmitting a DCI indicating a beam for the UE to use for the downlink communication while operating in the full duplex mode and where transmitting the downlink communication to the UE may be based on the default beam indicate din the control signaling or the beam indicated in the DCI.

In some examples of the method, apparatuses, and non-transitory computer-readable medium described herein, transmitting the control signaling may include operations, features, means, or instructions for transmitting an RRC message indicating the default beam for the UE to use for the downlink communication while operating in the full duplex mode.

In some examples of the method, apparatuses, and non-transitory computer-readable medium described herein, transmitting the control signaling may include operations, features, means, or instructions for transmitting a MAC-CE updating the default beam for the UE to use for the downlink communication while operating in the full duplex mode.

In some examples of the method, apparatuses, and non-transitory computer-readable medium described herein, transmitting the control signaling may include operations, features, means, or instructions for transmitting an indication of a default beam pair for the UE to use for one or more of the downlink communication or uplink communication while operating in the full duplex mode, the default beam pair including a default downlink beam and a default uplink beam and where transmitting the downlink communication may be based on the default beam pair.

Some examples of the method, apparatuses, and non-transitory computer-readable medium described herein may further include operations, features, means, or instructions for transmitting a DCI, the DCI excludes one or more of a downlink TCI state or an uplink TCI state.

Some examples of the method, apparatuses, and non-transitory computer-readable medium described herein may further include operations, features, means, or instructions for transmitting a DCI, the DCI includes a DCI field including a bit indicating to enable or disable the default beam pair.

Some examples of the method, apparatuses, and non-transitory computer-readable medium described herein may further include operations, features, means, or instructions for transmitting a DCI, the DCI associated with the default beam pair indicates the same TCI states as the default beam pair associated with the downlink communication and the uplink communication.

Some examples of the method, apparatuses, and non-transitory computer-readable medium described herein may further include operations, features, means, or instructions for transmitting a second indication of one or more power control parameters associated with the default beam pair and where transmitting the downlink communication may be based on the one or more power control parameters.

DETAILED DESCRIPTION

Figure 1:
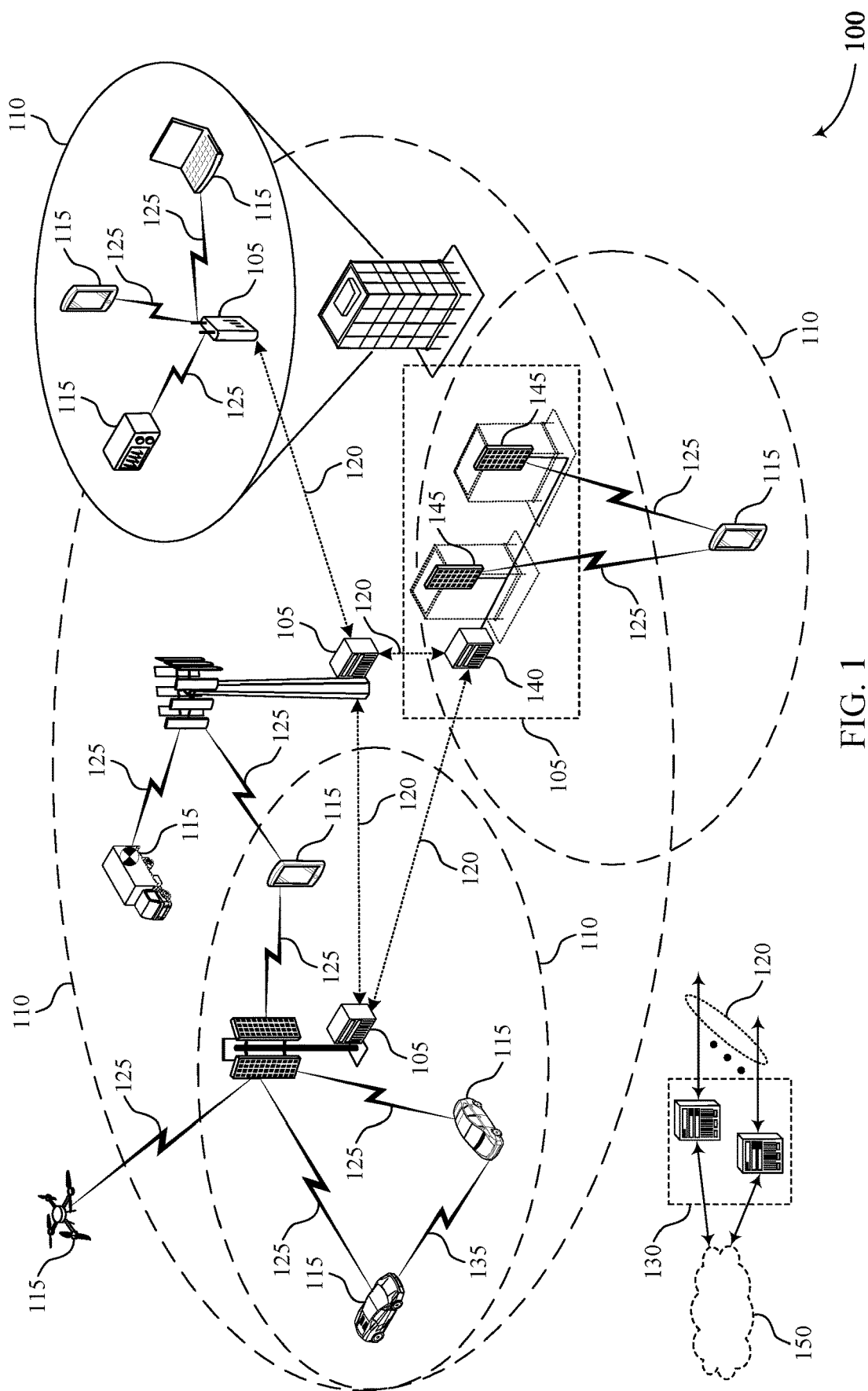
FIGS. 1 and 2 illustrates examples of wireless communications systems that support a full duplex default beam for wireless communication in accordance with aspects of the present disclosure.

A wireless communications system may include communication devices, such as a UE or a base station (e.g., an eNodeB (eNB), a next-generation NodeB or a giga-NodeB, any of which may be referred to as a gNB, or some other base station), that may support multiple radio access technologies. Examples of radio access technologies include 4G systems, such as LTE systems, and 5G systems, which may be referred to as NR systems. In the wireless communications system, a communication device. In the wireless communication system, the communication devices may support beamformed wireless communication while operating in a half duplex mode or a full duplex mode. When operating in the half duplex mode, the communication devices may separately (e.g., at different times) transmit beamformed wireless communication (e.g., uplink signals, downlink signals) or receive beamformed wireless communication (e.g., uplink signals, downlink signals). Alternatively, when operating in the full duplex mode, the communication devices may simultaneously transmit beamformed wireless communication (e.g., uplink signals, downlink signals) and receive beamformed wireless communication (e.g., uplink signals, downlink signals).

In some cases, the UE may be configured to use a half duplex default beam to support the beamformed wireless communication while operating in the half duplex mode. In some examples, the UE may be configured to use the half duplex default beam if the UE does not receive a beam activation message (e.g., a message activating a beam for use at the UE). In some other examples, the UE may be configured to use the half duplex default beam if the UE does not receive a beam activation message within a threshold period of time after receiving a beam indication (e.g., a message configuring the UE with a set of one or more beams). In other examples, the UE may be configured to use the half duplex default beam based at least in part on any other event triggering the use of the half duplex default beam.

Additionally or alternatively, the communication devices may support the beamformed wireless communication while operating in the full duplex mode, where the communication devices may contemporaneously transmit beamformed wireless communications and receive beamformed wireless communications. For example, a communication device, such as the UE may be configured to simultaneously transmit signals to, and receive signals from, another communication device, such as the base station, or multiple base stations. In some cases, while operating in the full duplex mode, the UE may use the half duplex default beam configured for the half duplex mode. However, using the half duplex default beam for the full duplex mode may be deficient, for example, due to differences between half duplex and full duplex communications. For example, a communication device performing beamformed wireless communication while operating in the full duplex mode may experience varying interference conditions, such as self interference (e.g., uplink beamformed communication interfering with downlink beamformed communication), interference between simultaneously operating communication links (e.g., uplink communications to a first base station interfering with downlink communications from a second base station), among other examples.

Various aspects of the present disclosure relate to enabling a communication device, such as the UE to support use of a full duplex default beam for beamformed wireless communication while operating in a full duplex mode. The communication device may receive control signaling, such as an RRC message, or a DCI, or a MAC-CE, that may indicate a full duplex default beam or a full duplex default beam pair for the communication device to use while operating in the full duplex mode. The communication device may determine or select the full duplex default beam or the full duplex default beam pair based on CORESETs associated with the control signaling, where a respective CORESET may correspond to the full duplex default beam (or a respective full duplex default beam of the full duplex default beam pair).

In some examples, another communication device, such as a base station, may indicate a single full duplex CORESET to the UE, where the full duplex CORESET may indicate a single full duplex default beam to use while operating in the full duplex mode. In some other examples, the base station may indicate a pair of CORESETs to the UE, where the pair of CORESETs may indicate a full duplex default beam pair. In other examples, the base station may indicate a CORESET identifier (ID) for each CORESET where, based on the CORESET ID, the UE may determine the one or more full duplex default beams. For example, a full duplex default beam may be associated with a lowest CORESET ID, a highest CORESET ID, or any indicated CORESET ID.

A full duplex default beam may be a default downlink beam or a default uplink beam, while a full duplex default beam pair may include both the default downlink beam and the default uplink beam. By enabling the communication device to support beamformed wireless communication using one or more of a full duplex default beam or a full duplex default beam pair when operating in the full duplex mode, the communication device may mitigate self-interference issues, among other examples, related to using a half duplex default beam when operating in a half duplex mode. In addition, by enabling the communication device to support beamformed wireless communication using one or more of a full duplex default beam or a full duplex default beam pair when operating in the full duplex mode, the communication device may experience decreased latency (e.g., due to switching from a half duplex default beam to a full duplex default beam), mitigate communication interference, and increase signal throughput, among other examples.

Aspects of the disclosure are initially described in the context of wireless communications systems. Aspects of the disclosure are further illustrated by and described with reference to apparatus diagrams, system diagrams, and flowcharts that relate to a full duplex default beam for wireless communication.

FIG. 1 illustrates an example of a wireless communications system 100 that supports a full duplex default beam for wireless communication in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

In the wireless communications system 100, one or more UEs 115 may be configured to employ operating modes that reduce power consumption, such as half duplex communications (e.g., a mode that supports one-way communication via transmission or reception, but not transmission and reception simultaneously). In some examples, half duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable or low-latency operations.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the medium access control (MAC) layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In the wireless communications system 100, one or more UEs 115 may be configured to employ operating modes that reduce latency, such as full duplex communications. A UE 115 may support use of a full duplex default beam for beamformed wireless communication while operating in a full duplex mode. The UE 115 may receive control signaling, such as an RRC message, or a DCI, or a MAC-CE, that may indicate a full duplex default beam or a full duplex default beam pair for the UE 115 to use while operating in the full duplex mode. The UE 115 may determine or select the full duplex default beam or the full duplex default beam pair based on CORESETs associated with the control signaling, where a respective CORESET may correspond to the full duplex default beam (or a respective full duplex default beam of the full duplex default beam pair). By enabling the UE 115 to support beamformed wireless communication using one or more of a full duplex default beam or a full duplex default beam pair when operating in the full duplex mode, the communication device may mitigate self-interference issues, among other example, related to using a half duplex default beam when operating in a half duplex mode.

Figure 2:
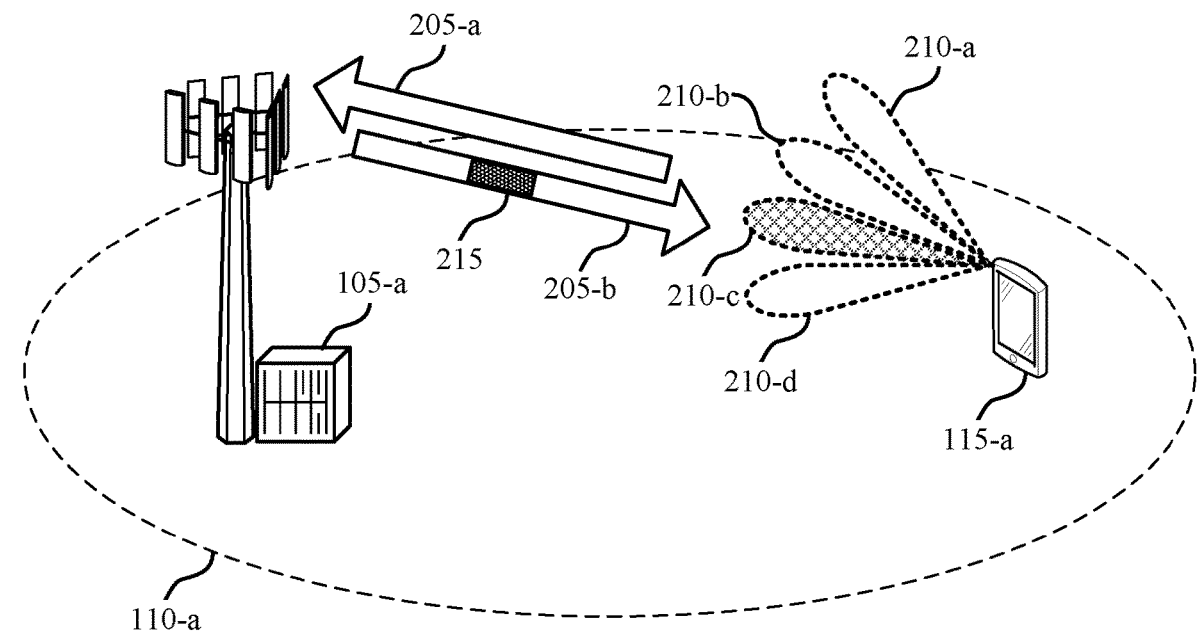

FIG. 2 illustrates an example of a wireless communications system 200 that supports a full duplex default beam for wireless communication in accordance with aspects of the present disclosure. The wireless communications system 200 may implement aspects of the wireless communications system 100 or may be implemented by aspects of the wireless communications system 100 as described with reference to FIG. 1. For example, the wireless communications system 200 may include a base station 105-a and a UE 115-a, which may be examples of corresponding devices as described with reference to FIG. 1. The base station 105-a and the UE 115-a may communicate within a geographic coverage area 110-a over communication links 205, which may be examples of geographic coverage areas and communication links 125 as described with reference to FIG. 1. In the example of FIG. 2, the base station 105-a and the UE 115-a may support beamformed wireless communication while operating in a full duplex mode.

One or more of the base station 105-a or the UE 115-a may be configured to support one or more of half duplex communications or full duplex communication. The UE 115-a may be full duplex capable such that the UE 115-a may simultaneously transmit uplink beamformed communication to the base station 105-a using a first panel (e.g., an antenna panel, an antenna port) and receive downlink beamformed communication from the base station 105-a using a second panel (e.g., an antenna panel, an antenna port). For example, the UE 115-a may be operable to support beamformed wireless communication with the base station 105-a using an uplink communication link 205-a and a downlink communication link 205-b at the same time. In some cases, full duplex capable devices may communicate with multiple devices at the same time. For example, the base station 105-a may simultaneously transmit downlink beamformed communication to the UE 115-a and may receive uplink beamformed communication from another UE 115. In such an example, the base station 105-a may use a first panel (e.g., an antenna panel, an antenna port) to receive the uplink beamformed communication and a second panel (e.g., an antenna panel, an antenna port) to transmit the downlink beamformed communication.

One or more of the base station 105-a or the UE 115-a may support full duplex beamformed communications using one or more beams 210. For example, the UE 115-a may be full duplex capable and may support beamformed communications such that the UE 115-a may simultaneously transmit uplink beamformed communication to the base station 105-a and receive downlink beamformed communication from the base station 105-a using one or more beams 210. In some examples, one or more of the base station 105-a or the UE 115-a may use the same beam 210 for full duplex communications. For example, the UE 115-a may use a beam 210-c to support both the uplink communication link 205-a and the downlink communication link 205-b. In some examples, one or more of the base station 105-a or the UE 115-a may use different beams 210 for full duplex communications. For example, the UE 115-a may use a beam 210-b for the uplink communication link 205-a and the beam 210-c for the downlink communication link 205-b.

A full duplex capability of one or more of the base station 105-a or the UE 115-a may depend on a beam separation, a beam width, among other examples. In such cases, beam separation, beam widths, and the like may correspond to varying channel impairments. For example, using the one or more beams 210 with relatively small beam separation (e.g., with substantially bordering beam boundaries) may result in increased self-interference between downlink and uplink, clutter echo, among other signal impairments, due to the proximity of such beams 210. The base station 105-a may configure the UE 115-a to use one or more beams 210 for beamformed wireless communications, for example, to mitigate channel impairments. In the example of FIG. 2, the base station 105-a may transmit a control message 215 configuring, or updating, the UE 115-a with one or more respective beams 210, where the one or more respective beams 210 may be associated with a signal throughput, a reference signal received power (RSRP), or the like, at the UE 115-a.

For example, the UE 115-a may communicate with the base station 105-a using half duplex communications where the UE 115-a may transmit uplink beamformed communication and receive downlink beamformed communication during separate periods of time (e.g., non-overlapping time periods). In such an example, the base station 105-a may configure the UE 115-a with a default beam 210 for the half duplex communications, where the base station 105-a may configure the default beam 210 to be a beam with relatively low channel impairment (e.g., as compared to another beam with a low signal throughput). As such, the base station 105-a may transmit the control message 215 to configure the UE 115-a to use the default beam 210 for such half duplex communications. In some cases, the base station 105-a may configure the default beam 210 referencing, or otherwise based on, one or more interference measurements (e.g., RSRP measurements), such that the base station 105-a may indicate a respective beam 210 with relatively low interference (e.g., as compared to one or more other beams 210) as the default beam 210.

In some examples, the UE 115-a may use the default beam 210 for full duplex communications. For example, the UE 115-a may operate in a full duplex mode, where the UE 115-a may determine to use the default beam 210 for full duplex communications. However, using the default beam 210 for full duplex communications may be deficient, for example, due to varying conditions between half duplex communications and full duplex communications. For example, when configured in the full duplex mode, the UE 115-a may experience self-interference from simultaneously using multiple antenna panels for uplink communications and downlink communications, resulting in a different interference environment as compared to the UE 115-a being configured in a half duplex mode. In other words, the UE 115-a may experience different interference when communicating in a full duplex mode as compared to communicating in a half duplex mode, such that, in some cases, the default beam 210 used for half duplex communications (e.g., associated with low interference when communicating with half duplex communications) may not be sufficient for full duplex communications.

The base station 105-a and the UE 115-a may support one or more default beams 210 with relatively low interference in a full duplex environment (e.g., full duplex default beams 210). In some examples, the base station 105-a may transmit the control message 215, to the UE 115-a, indicating one or more default beams 210 for the UE 115-*a* to use for full duplex communications. The control message 215 may indicate a single default beam 210, a full duplex default beam pair, or any other default beam(s) 210 associated with full duplex communications. In an example, the control message 215 may include an indication of a single default beam 210. For example, the control message 215 may include an indication of the beam 210-*c*, where in response to receiving the control message 215, the UE 115-*a* may determine that the beam 210-*c* is the default beam 210 and, in some cases, may transmit uplink and receive downlink using the beam 210-*c*. Additionally or alternatively, the control message 215 may indicate multiple default beams 210 (e.g., a full duplex default beam pair). For example, the control message 215 may include an indication of the beam 210-*b* and the beam 210-*c*, such that the UE 115-*a* may receive the control message 215 and, in some cases, may determine that the beams 210 indicated in the control message 215 are the default beam pair. The UE 115-*a* may use the default beam pair for full duplex communications.

In the wireless communications system 200, the UE 115-*a* may be configured to use default beams 210 corresponding to full duplex communications to provide for the selection and use of beams 210 associated with relatively high signal throughput in a full duplex communication environment, in some cases, resulting in less beam switches, higher signal throughput, decreased channel impairment, among other examples. For example, the base station 105-*a* may configure the UE 115-*a* with a half duplex default beam for receiving a downlink full duplex communication (e.g., full duplex physical downlink shared channel (PDSCH) transmissions). In some cases, the base station 105-*a* may determine to switch the beam at the UE 115-*a*, based on the half duplex default beam having relatively high channel interference as compared to another beam 210, where the other beam 210 may be associated with sufficient signal throughput in a full duplex communication environment. Rather than configuring the UE 115-*a* with the half duplex default beam for receiving downlink full duplex communications, the base station 105-*a* may configure the UE 115-*a* to use a full duplex default beam (or default beam pair), mitigating the intermediate beam switch associated with using the half duplex default beam (e.g., enabling averaging one or more reference signals with channel coherence for channel estimation). Additionally, for higher band communications (e.g., 62-71 GHz frequency band), switching beams may take a symbol time duration, where configuring the full duplex default beam (or default beams) may save such an overhead gap.

Figure 3A:
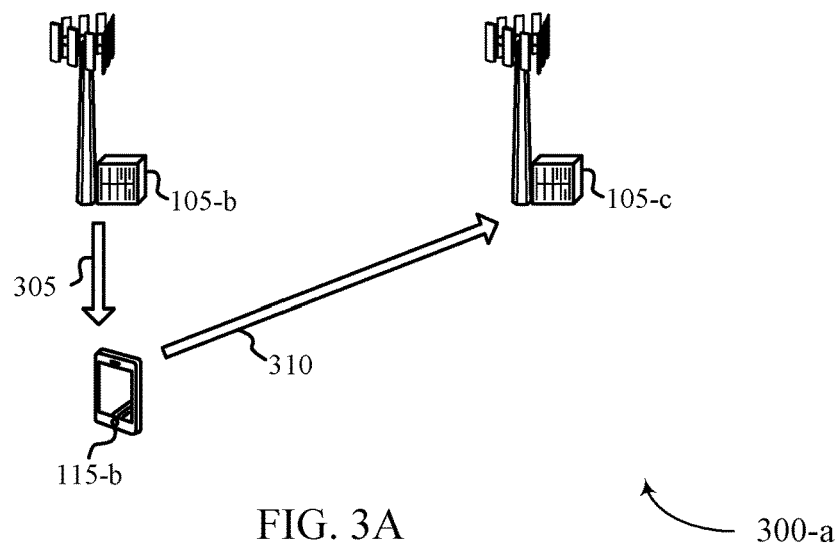
FIGS. 3A through 3C illustrate example of wireless communication systems that support a full duplex default beam for wireless communication in accordance with aspects of the present disclosure.

FIG. 3A illustrates an example of a wireless communications system 300-*a* that supports a full duplex default beam for wireless communication in accordance with aspects of the present disclosure. The wireless communications system 300-*a* may implement aspects of the wireless communications systems 100 and 200 or may be implemented by aspects of the wireless communications systems 100 and 200 as described with reference to FIG. 1. For example, the wireless communications system 300-*a* may include a base station 105-*b*, a base station 105-*c*, and a UE 115-*b*, which may be examples of corresponding devices as described with reference to FIGS. 1 and 2. In the example of FIG. 3A, the UE 115-*b* may support beamformed wireless communication with the base station 105-*b* (e.g., a first TRP) and the base station 105-*c* (e.g., a second TRP) while operating in a full duplex mode.

The UE 115-*b* may concurrently (e.g., at the same time) receive downlink beamformed communication 305 from the base station 105-*b* using one antenna panel, and transmit uplink beamformed communication 310 to the base station 105-*c* using another antenna panel. The UE 115-*b* may support beamformed wireless communication with the base station 105-*b* and the base station 105-*c* using a full duplex default beam or a full duplex default beam pair (e.g., a full duplex downlink default beam and a full duplex uplink default beam). For example, the UE 115-*b* may concurrently receive the downlink beamformed communication 305 from the base station 105-*b* using a full duplex downlink default beam, and transmit the uplink beamformed communication 310 to the base station 105-*c* using a full duplex uplink default beam.

By enabling the UE 115-*b* to support beamformed wireless communication using one or more of a full duplex default beam or a full duplex default beam pair when operating in the full duplex mode, the UE 115-*b* may mitigate self-interference issues, among other examples. Additionally, enabling the UE 115-*b* to support beamformed wireless communication using one or more of a full duplex default beam or a full duplex default beam pair when operating in the full duplex mode may reduce latency (e.g., enabling the UE 115-*b* to receive downlink beamformed communication during one or more uplink slots), increased spectrum efficiency (e.g., increased efficiency per cell, increased efficiency for the UE 115-*b*), efficient resource utilization, among other examples.

Figure 3B:
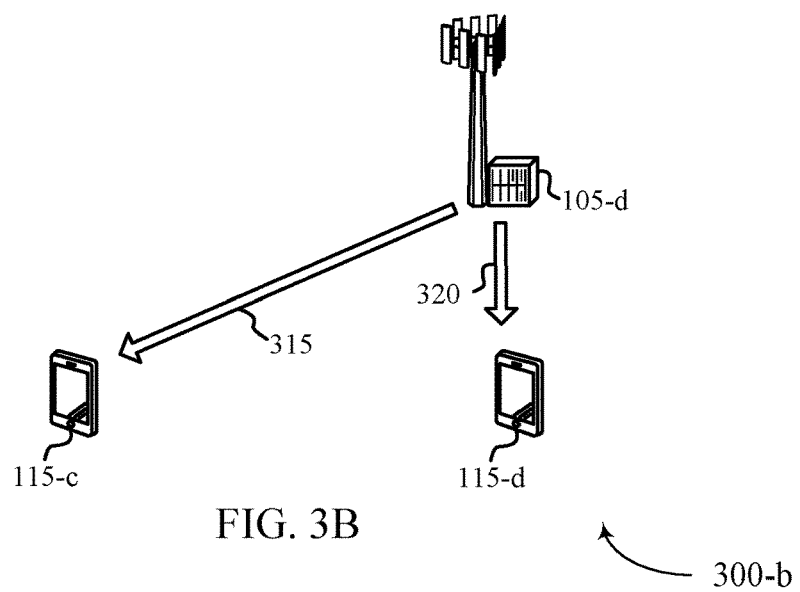

FIG. 3B illustrates an example of a wireless communications system 300-*b* that supports a full duplex default beam for wireless communication in accordance with aspects of the present disclosure. The wireless communications system 300-*b* may implement aspects of the wireless communications systems 100 and 200 or may be implemented by aspects of the wireless communications systems 100 and 200 as described with reference to FIG. 1. For example, the wireless communications system 300-*b* may include a base station 105-*d*, a UE 115-*c*, and a UE 115-*d*, which may be examples of corresponding devices as described with reference to FIGS. 1 and 2. In the example of FIG. 3B, the base station 105-*d* may support beamformed wireless communication with the UE 115-*c* and the UE 115-*d* while operating in a full duplex mode.

For example, the base station 105-*d* may simultaneously (e.g., at the same time) transmit downlink beamformed communication 315 to the UE 115-*c* using one antenna panel, and transmit downlink beamformed communication 320 to the UE 115-*d* using another antenna panel. In some examples, the base station 105-*d* may support beamformed wireless communication with the UE 115-*c* and the UE 115-*d* using a full duplex default beam or a full duplex default beam pair. For example, the base station 105-*d* may concurrently transmit the downlink beamformed communication 315 to the UE 115-*c* using a full duplex default beam, and transmit the downlink beamformed communication 320 to the UE 115-*d* using the same full duplex default beam or a different full duplex default beam. Likewise, one or more of the UE 115-*c* or the UE 115-*d* may receive the downlink beamformed communication 315 using a full duplex default beam or receive the downlink beamformed communication 320 using another full duplex default beam.

By enabling one or more of the UE 115-*c* or the UE 115-*d* to support beamformed wireless communication using one or more of a full duplex default beam or a full duplex default beam pair when operating in the full duplex mode, one or more of the UE 115-*c* or the UE 115-*d* may alleviate self-interference problems. In addition, by enabling one or more of the UE 115-*c* or the UE 115-*d* to support beamformed wireless communication using one or more of a full duplex default beam or a full duplex default beam pair when operating in the full duplex mode may reduce latency (e.g., enabling one or more of the UE 115-c or the UE 115-d to receive downlink beamformed communication during one or more uplink slots), increased spectrum efficiency (e.g., increased efficiency per cell, increased efficiency for one or more of the UE 115-c or the UE 115-d), among other examples.

Figure 3C:
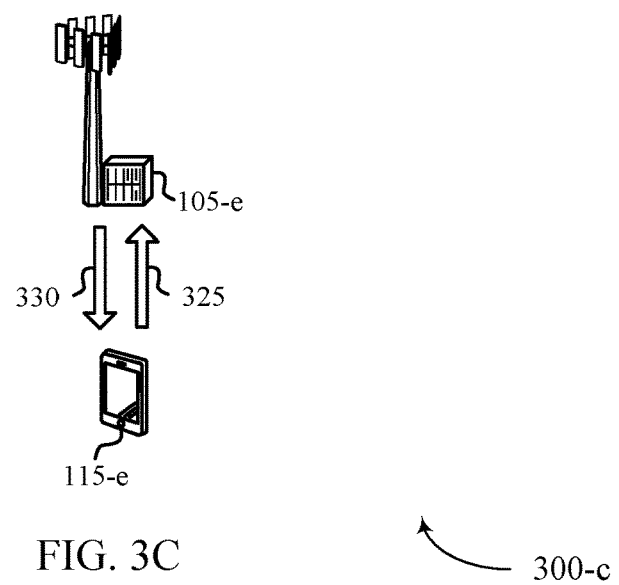

FIG. 3C illustrates an example of a wireless communications system 300-c that supports a full duplex default beam for wireless communication in accordance with aspects of the present disclosure. The wireless communications system 300-c may implement aspects of the wireless communications systems 100 and 200 or may be implemented by aspects of the wireless communications systems 100 and 200 as described with reference to FIG. 1. For example, the wireless communications system 300-c may include a base station 105-e and a UE 115-e, which may be examples of corresponding devices as described with reference to FIGS. 1 and 2. In the example of FIG. 3C, the base station 105-e and the UE 115-e may support beamformed wireless communication with each other while operating in a full duplex mode.

The base station 105-e may at the same time transmit downlink beamformed communication 330 to the UE 115-e using one antenna panel, and receive uplink beamformed communication 325 from the UE 115-e using another antenna panel. Likewise, the UE 115-e may at the same time receive the downlink beamformed communication 330 from the base station 105-e using one antenna panel, and transmit the uplink beamformed communication 325 to the base station 105-e using another antenna panel. In some examples, one or more of the base station 105-e and the UE 115-e may supported beamformed wireless communication using a full duplex default beam or a full duplex default beam pair. For example, the base station 105-e may at the same time transmit downlink beamformed communication 330 to the UE 115-e using a full duplex downlink default beam, and receive uplink beamformed communication 325 from the UE 115-e using a using a full duplex uplink default beam. Likewise, the UE 115-e may at the same time receive the downlink beamformed communication 330 from the base station 105-e using a full duplex downlink default beam, and transmit the uplink beamformed communication 325 to the base station 105-e using full duplex uplink default beam.

By enabling one or more of the base station 105-e or the UE 115-e to support beamformed wireless communication using one or more of a full duplex default beam or a full duplex default beam pair when operating in the full duplex mode, one or more of the base station 105-e or the UE 115-e may alleviate self-interference problems. The wireless communications system 300-c may also reduce latency (e.g., enabling one or more of the UE 115-c or the UE 115-d to receive downlink beamformed communication during one or more uplink slots), increased spectrum efficiency (e.g., increased efficiency per cell, increased efficiency for one or more of the UE 115-c or the UE 115-d), among other examples by enabling one or more of the base station 105-e or the UE 115-e to support beamformed wireless communication using one or more of a full duplex default beam or a full duplex default beam pair when operating in the full duplex mode.

Figure 4:
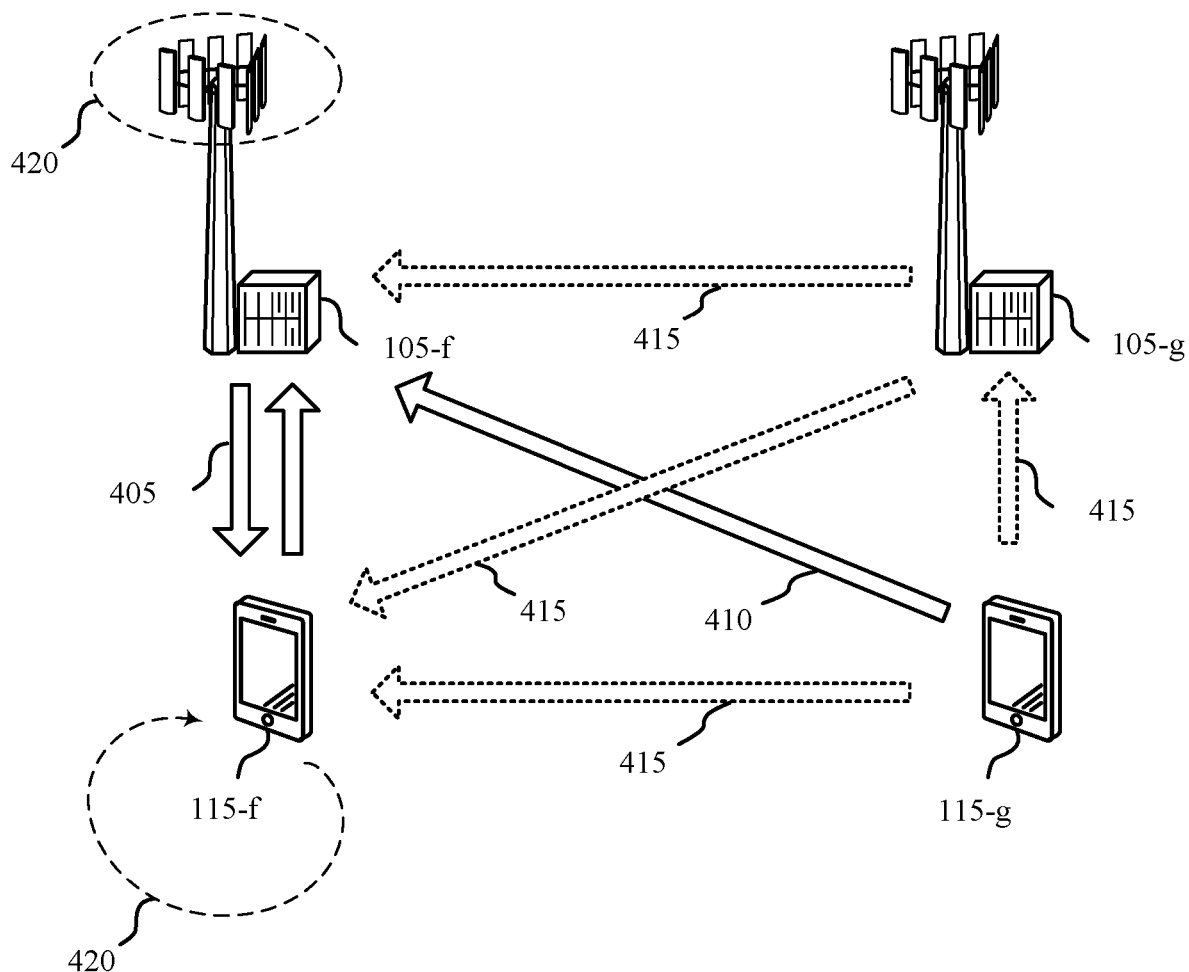
FIG. 4 illustrates an example of a wireless communications system that supports a full duplex default beam for wireless communication in accordance with aspects of the present disclosure.

FIG. 4 illustrates an example of a wireless communications system 400 that supports a full duplex default beam for wireless communication in accordance with aspects of the present disclosure. The wireless communications system 400 may implement aspects of the wireless communications systems 100, 200, and 300-a through 300-c or may be implemented by aspects of the wireless communications systems 100, 200, and 300-a through 300-c as described with reference to FIG. 1. For example, the wireless communications system 400 may include a base station 105-f, a base station 105-g, a UE 115-f, and a UE 115-g, which may be examples of corresponding devices as described with reference to FIGS. 1, 2, and 3A through 3C. One or more of the base station 105-f, the base station 105-g, the UE 115-f, or the UE 115-g may support beamformed wireless communication while operating in one or more of half duplex mode or a full duplex mode.

In the example of FIG. 4, one or more of the base station 105-f, the base station 105-g, the UE 115-f, or the UE 115-g may experience self-interference. Self-interference may result when one or more of the base station 105-f, the base station 105-g, the UE 115-f, or the UE 115-g experiences interference from a signal which is communicated by one or more of the base station 105-f, the base station 105-g, the UE 115-f, or the UE 115-g (e.g., at a receiving or sensing side of the full duplex device). For example, a transmission by one or more of the base station 105-f, the base station 105-g, the UE 115-f, or the UE 115-g may interfere with reception at one or more of the base station 105-f, the base station 105-g, the UE 115-f, or the UE 115-g, as energy propagated by antennas used for transmission may reach antennas used for reception.

The base station 105-f may experience self-interference from downlink beamformed communications to uplink beamformed communications. For example, the base station 105-f may transmit downlink beamformed communication 405 to the UE 115-f using at least one antenna panel and receive uplink beamformed communication 410 from the UE 115-g using another antenna panel. This transmission of the downlink beamformed communication 405 to the UE 115-f at a same time as reception of the uplink beamformed communication 410 from the UE 115-g may cause self-interference 420 at the base station 105-g, as energy propagated from the transmitting antennas may interfere with the receiving antennas. Additionally or alternatively, the base station 105-f may experience some interference from transmissions by the base station 105-g, such as base station-to-base station signaling or downlink beamformed communication to a UE 115 (e.g., the UE 115-f or the UE 115-g). In some cases, the uplink beamformed communication 410 from the UE 115-g (e.g., to the base stations 105 or to the UE 115-f directly) may cause interference to the reception of the downlink beamformed communication 405 at the UE 115-f.

The UE 115-f may experience self-interference 420 while operating in a full duplex mode. For example, the base station 105-f may transmit downlink beamformed communication 405 to the UE 115-f, which the UE 115-f may receive via at least one antenna panel of the UE 115-f. The UE 115-f may also transmit uplink beamformed communication 410 to the base station 105-f via another antenna panel of the UE 115-f. This concurrent receiving of the downlink beamformed communication 405 and transmitting of the uplink beamformed communication 410 may cause self-interference 420 at the UE 115-f, as energy propagated from the transmitting antennas of the UE 115-f may affect the antennas receiving the downlink beamformed communication 405. Additionally or alternatively, the downlink beamformed communication 405 from the base station 105-f or an uplink beamformed communication 415 from the UE 115-g may cause interference at the UE 115-*f* (e.g., interfering with receiving the downlink beamformed communication 405 from the base station 105-*f*).

In the example of FIG. 4, because one or more of the base station 105-*f*, the base station 105-*g*, the UE 115-*f*, or the UE 115-*g* support full-duplex communications, one or more of the base station 105-*f*, the base station 105-*g*, the UE 115-*f*, or the UE 115-*g* may experience the self-interference 420. In some cases, the wireless communications system 400 may implement default beams associated with full duplex communications to prevent self-interference. For example, in some cases, one or more of the UEs 115 may use a half duplex default beam for full duplex communications, where the half duplex default beam may be associated with low signal impairment in a half duplex communication environment. Full duplex communications and half duplex communications may be associated with different interference sources, for example, in full duplex communications, a UE 115 may be subject to self-interference. As such, configuring the UEs 115 to use default beams associated with full duplex communications may result in higher signal throughput, decreased beam switches, among other example.

Figure 5:
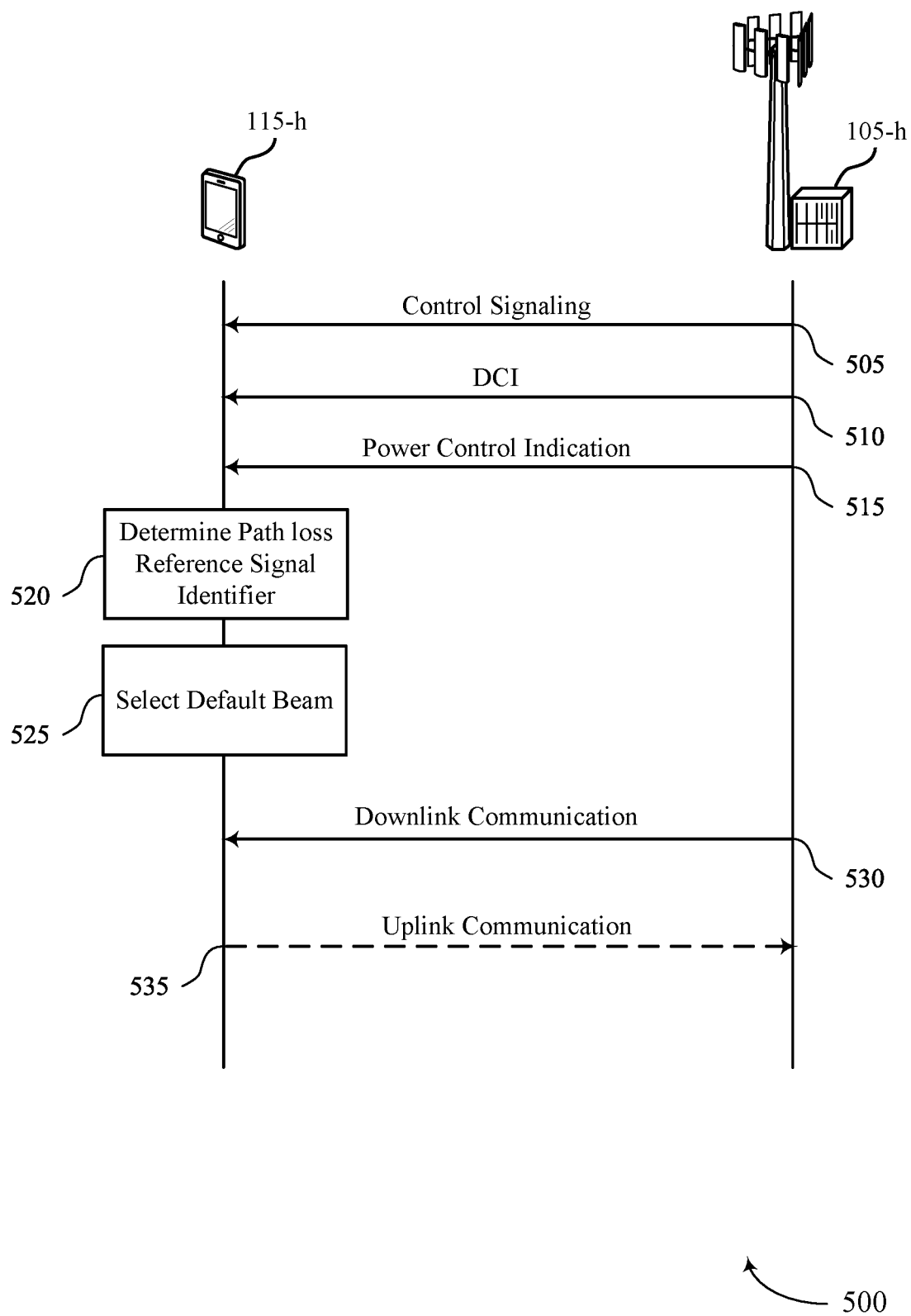
FIG. 5 illustrates an example of a process flow that supports a full duplex default beam for wireless communication in accordance with aspects of the present disclosure.

FIG. 5 illustrates an example of a process flow 500 that supports a full duplex default beam for wireless communication in accordance with aspects of the present disclosure. The process flow 500 may implement or be implemented by one or more aspects of the wireless communications systems 100, 200, 300-*a* through 300-*c*, and 400. For example, the process flow 500 may include a base station 105-*h* and a UE 115-*h*, which may be examples of a base station 105 and a UE 115 described with reference to FIGS. 1, 2, 3A through 3C, and 4. In the following description of the process flow 500, operations between the base station 105-*h* and the UE 115-*h* may occur in a different order or at different times than as shown. Some operations may also be omitted from the process flow 500, and other operations may be added to the process flow 500.

At 505, the base station 105-*h* may transmit, and the UE 115-*h* may receive control signaling. For example, the control signaling may indicate a default beam (e.g., a full duplex default beam) for the UE 115-*h* to use for downlink communications while operating in a full duplex mode. In such an example, the default beam for the full duplex mode may be different than a default beam for downlink communications while operating in a half duplex mode. In some examples, the base station 105-*h* may transmit the control signaling at 505 as (or within) an RRC message indicating the default beam to use for the downlink communication. In some examples, the base station 105-*h* may transmit the control signaling at 505, or another control signal, as (or within) a MAC-CE message updating the default beam to use for the downlink communication. In some examples, the control signaling may indicate a default beam pair (e.g., a full duplex default beam pair) for the UE 115-*h* to use for uplink communications, downlink communications, or both, while operating in a full duplex mode. Additionally, the default beam pair may include a default downlink beam and a default uplink beam.

At 510, the base station 105-*h* may transmit, and the UE 115-*h* may receive a DCI associated with the default beam or beam pair. In some cases, the base station 105-*h* may indicate a default beam pair, refraining from indicating downlink and uplink transmission configuration indicator (TCI) states in a DCI for full duplex transmissions, reducing signaling overhead. For example, the DCI may lack a TCI state in one or more symbols associated with a full duplex mode, indicating that the UE 115-*h* may use the default beam pair from the control signaling at 505. In another example, the DCI may include a DCI information field including a bit (e.g., a reserved or unused bit) indicating to enable or disable the default beam pair. In yet another example, the DCI may indicate TCI states corresponding to the respective uplink and downlink communications associated with the default beam pair. In other examples, the DCI (e.g., a DCI format 1_0) may not include a field for a downlink TCI state, an uplink TCI state, or both while the UE 115-*h* operates in the full duplex mode. In such examples, the DCI may be a full duplex scheduling DCI used to schedule full duplex communications and the UE 115-*h* may be configured to use the default beam pair for full duplex transmissions and receptions.

At 515, the base station 105-*h* may transmit, and the UE 115-*h* may receive a power control indication associated with the default beam pair. For example, the base station 105-*h* may transmit an indication including a nominal power parameter (e.g., P0), a power factor parameter (e.g., a), or a closed loop-index parameter, to the UE 115-*h* where the UE 115-*h* may use the power control indication to determine a transmit power for subsequent uplink communications to the base station 105-*h*. The base station 105-*h* may transmit the power control indication as (or within) an RRC message, a MAC-CE message, or any other message used to indicate power control parameters.

At 520, the UE 115-*h* may determine a path loss reference signal identifier associated with one or more uplink channels for uplink communications with the base station 105-*h*. In some examples, the UE 115-*h* may determine the path loss reference signal identifier referencing, or otherwise based on, an explicit signal. For example, the control signaling at 505, the power control indication 515, or a combination thereof may include an explicit indication of the path loss reference signal identifier, where the UE 115-*h* may determine the path loss reference signal identifier and may adjust one or more power control parameters associated with transmitting subsequent uplink communications to the base station 105-*h*. In other examples, the UE 115-*h* may determine the path loss reference signal identifier referencing, or otherwise based on, an implicit signal. For example, the UE 115-*h* may identify an uplink TCI state or an uplink spatial relation information associated with the default beam pair, where the UE 115-*h* may determine the path loss reference signal identifier referencing, or otherwise based on the uplink TCI state, the uplink spatial relation information, or a combination thereof. The UE 115-*h* may use the path loss reference signal identifier to identify a path loss reference signal which may aid the UE 115-*h* in determining a transmit power for one or more subsequent uplink transmissions.

At 525, the UE 115-*h* may select a default beam to use for downlink communication while operating in full duplex mode. For example, the UE 115-*h* may select the default beam to use for the downlink communication while operating in full duplex mode based on the control signaling at 505, where the UE 115-*h* may select the default beam as the default beam indicated in the control signaling at 505. In some examples, the UE 115-*h* may select a default beam pair to use for downlink communication and uplink communication while operating in the full duplex mode. In some cases, the UE 115-*h* may select the default beam pair based on an absence of a TCI state in one or more symbols associated with the full duplex mode, a bit in a DCI field enabling or disabling a default beam pair, one or more TCI states associated with the default beam pair, or any other information aiding the selection of the default beam pair, for example, within the DCI message at 510.

In some examples, the UE 115-*h* may select a default beam for downlink communications based on one or more conditions. In an example, the UE 115-*h* may receive an RRC message configuring one or more candidate TCI states, where if the UE 115-*h* does not receive a message activating a TCI state of the one or more candidate TCI states, the UE 115-*h* may be configured to use the default beam or default beam pair for full duplex communications. In another example, the UE 115-*h* may receive a command activating a number of TCI states (e.g., a MAC-CE message activating 8 TCI states out of 64 TCI states indicated in an RRC message), but a scheduling offset, a CSI-RS triggering offset, or both, may be less than a beam switch latency threshold (e.g., beamSwitchingTiming). In such an example, the UE 115-*h* may be configured to use the default beam or default beam pair for full duplex communications. In yet another example, the UE 115-*h* may receive a command activating or updating a beam, but the time between the reception of such a command, or the UE 115-*h* receiving, transmitting, or acknowledging a reference signal associated with the command, and the application of the beam may satisfy a threshold time. In such an example, the UE 115-*h* may use the default beam or default beam pair for full duplex communications.

The UE 115-*h* may select the default beam for the downlink communication based on (e.g., in accordance with) a first duration being less than a second duration. For example, the UE 115-*h* may determine that a time duration (e.g., the first duration) between receiving a DCI message and receiving a corresponding downlink message (e.g., a PDSCH message) may be less than a time duration as indicated by a timing parameter (e.g., the second duration, timeDurationForQCL). In such an example, the UE 115-*h* may determine to use the default beam, such as the default beam indicated in the control signaling at 505). In another example, the UE 115-*h* may determine that a time duration (e.g., the first duration) between receiving a DCI message and receiving a corresponding downlink message (e.g., a PDSCH message) may be greater than a time duration as indicated by a timing parameter (e.g., the second duration, timeDurationForQCL). As such, the UE 115-*h* may use a beam indicated in the DCI, for example, a beam associated with a TCI state in the DCI.

In some examples, the UE 115-*h* may determine the default beam to use for downlink communication while operating in full duplex mode based on a CORESET ID of a set of CORESET IDs associated with full duplex mode. For example, the base station 105-*h* may indicate the default beam by configuring the UE 115-*h* with a CORESET, such that the UE 115-*h* may identify the CORESET and determine the default beam. That is, the indicated CORESET may point to the default beam. In such an example, the UE 115-*h* may determine the CORESET and the default beam by identifying the CORESET ID of the CORESET. In some examples, the UE 115-*h* may determine the default beam based on a highest CORESET ID or a lowest CORESET ID. That is, the UE 115-*h* may determine to use a default beam, where the UE 115-*h* may select the default beam based on a beam having the highest CORESET ID or the lowest CORESET ID. The UE 115-*h* may likewise determine a default beam pair for full duplex communications by identifying a full duplex CORESET indicated by the base station 105-*f*, for example, by identifying respective indicated CORESET IDs. In some cases, the set of CORESET IDs associated with the full duplex mode may be different than a respective set of CORESET IDs associated with a half duplex mode.

At 530, the UE 115-*h* may receive downlink communication based on (e.g., using) the default beam. In some examples, the UE 115-*h* may receive the downlink communications using a downlink default beam of a default beam pair. For example, the UE 115-*h* may receive the downlink communications using the one or more beams indicated in the control signaling at 505. In some examples, the UE 115-*h* may receive the downlink communications in accordance with (e.g., using) the one or more power control parameters, for example, the power control parameters as indicated in the power control indication at 515. In some cases, the UE 115-*h* may receive the downlink communication with a default beam associated with a component carrier. For example, the base station 105-*h* may indicate a CORESET associated with a component carrier corresponding to a beam, to the UE 115-*h*. That is, the component carrier may point to the default beam (or beam pair). As such, the UE 115-*h* may receive the downlink communication using the default beam associated with such a component carrier. In some examples, the indicated CORESET may not be configured for (e.g., may not at least partially overlap with) the component carrier indicating the default beam (or beam pair). As such, the UE 115-*h* may use a default beam (or beam pair) as indicated in the control signaling at 505.

In some examples, at 535, the UE 115-*h* may transmit uplink communications to the base station 105-*h* using a default beam, for example, the uplink default beam indicated in a default beam pair. In some cases, the UE 115-*h* may transmit the uplink communication in accordance with the path loss reference signal identifier associated with the one or more uplink channel for the uplink communication in the full duplex mode. For example, the UE 115-*h* may transmit the uplink communication using an uplink transmit power determined based on, or otherwise using, the pathloss reference signal identifier. In some examples, the UE 115-*h* may transmit the uplink communication using a transmit power determined using the power control parameters indicated in the power control indication at 515, or a combination thereof.

Figure 6:
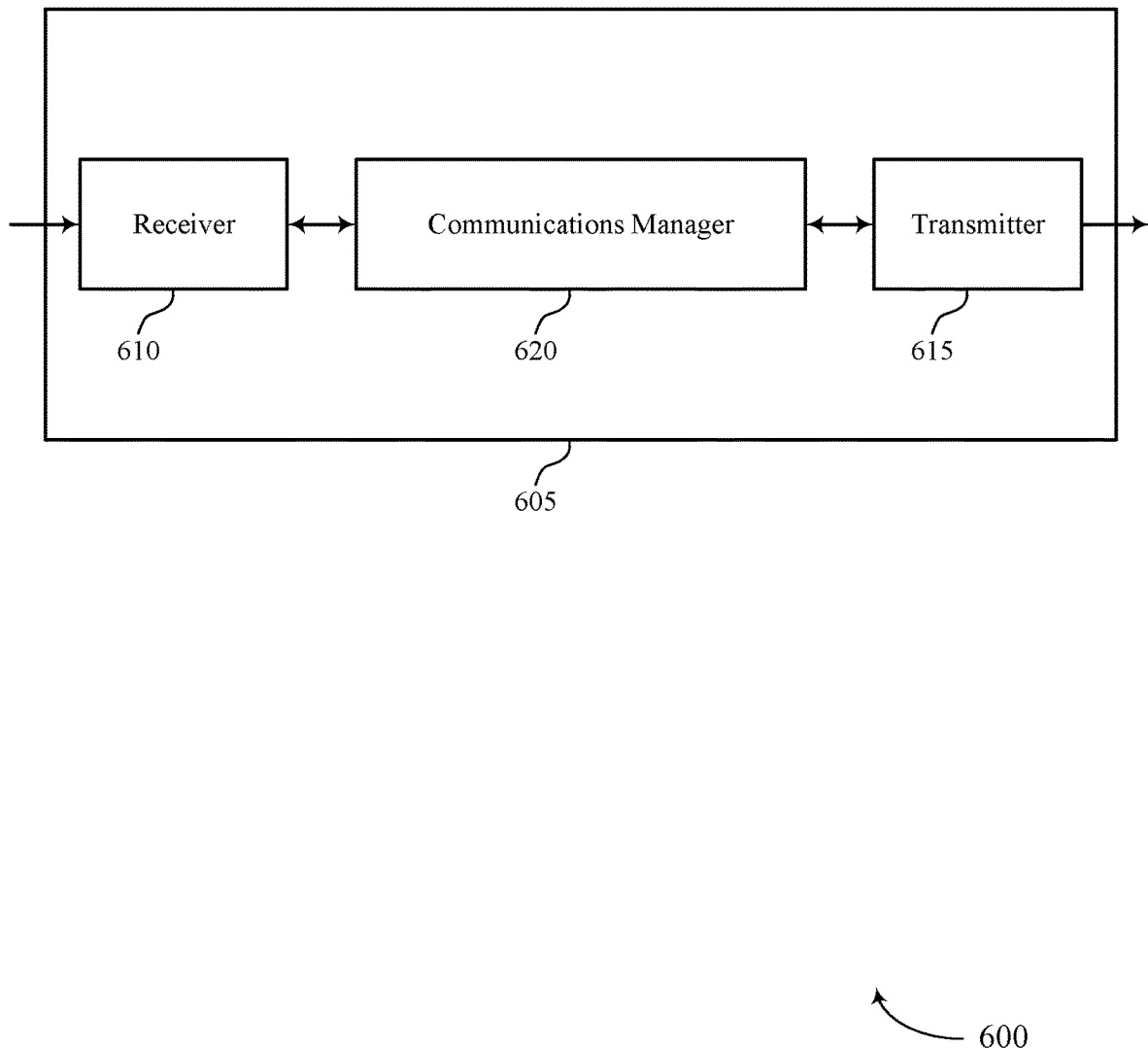
FIGS. 6 and 7 show block diagrams of devices that support a full duplex default beam for wireless communication in accordance with aspects of the present disclosure.

FIG. 6 shows a block diagram 600 of a device 605 that supports a full duplex default beam for wireless communication in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to a full duplex default beam for wireless communication). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to a full duplex default beam for wireless communication). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of a full duplex default beam for wireless communication as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication the device 605 (e.g., a UE) in accordance with examples as disclosed herein. For example, the communications manager 620 may be configured as or otherwise support a means for selecting a default beam to use for downlink communication while operating in a full duplex mode. The communications manager 620 may be configured as or otherwise support a means for receiving the downlink communication based on the default beam. By including or configuring the communications manager 620 in accordance with examples as described herein, the device 605 (e.g., a processor controlling or otherwise coupled to the receiver 610, the transmitter 615, the communications manager 620, or a combination thereof) may support techniques for reduced power consumption and more efficient utilization of communication resources by enabling the device 605 to select a default beam to use for downlink communication while operating in a full duplex mode.

Figure 7:
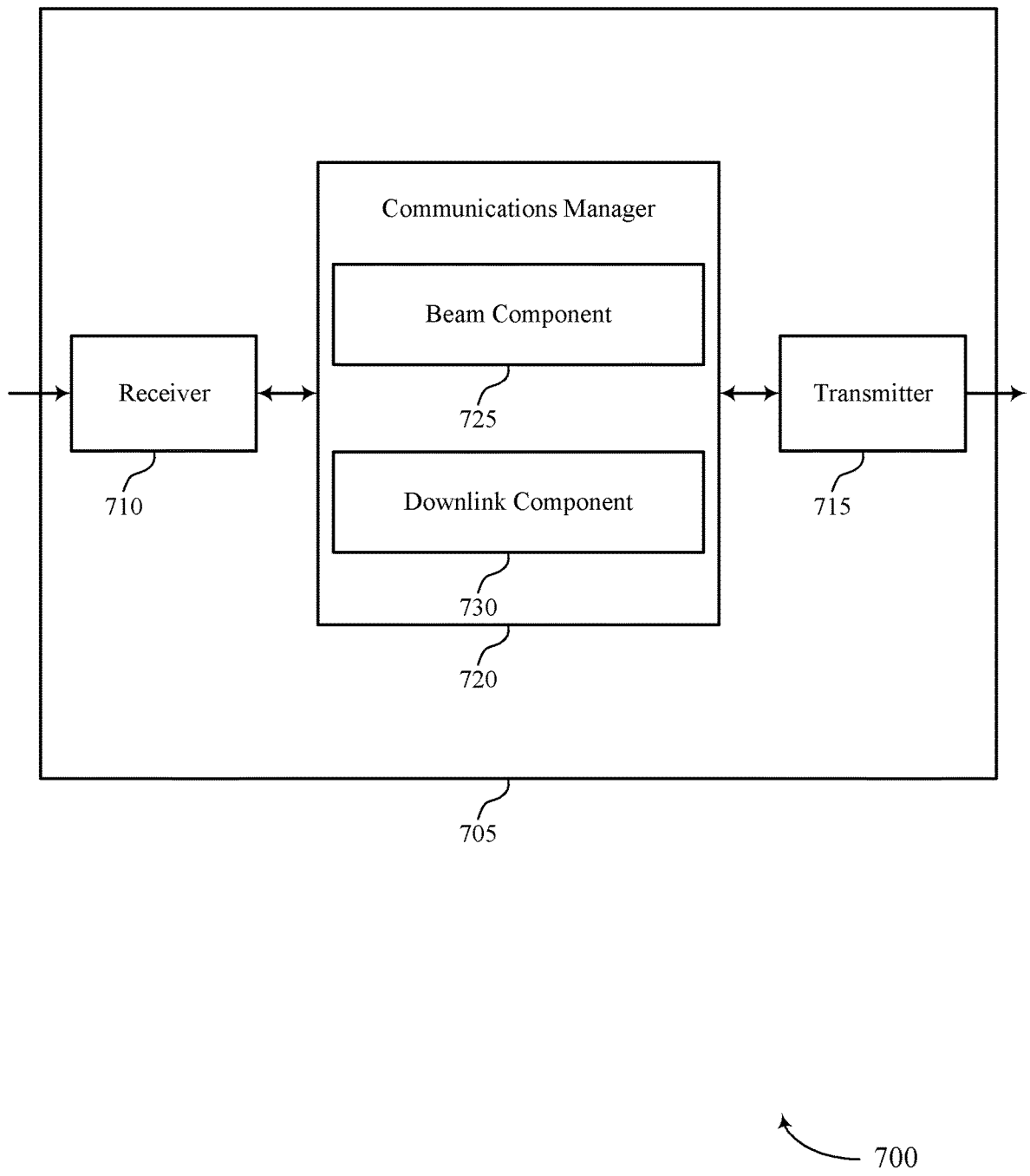

FIG. 7 shows a block diagram 700 of a device 705 that supports a full duplex default beam for wireless communication in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to a full duplex default beam for wireless communication). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to a full duplex default beam for wireless communication). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of a full duplex default beam for wireless communication as described herein. For example, the communications manager 720 may include a beam component 725 a downlink component 730, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at the device 705 (e.g., a UE) in accordance with examples as disclosed herein. The beam component 725 may be configured as or otherwise support a means for selecting a default beam to use for downlink communication while operating in a full duplex mode. The downlink component 730 may be configured as or otherwise support a means for receiving the downlink communication based on the default beam.

Figure 8:
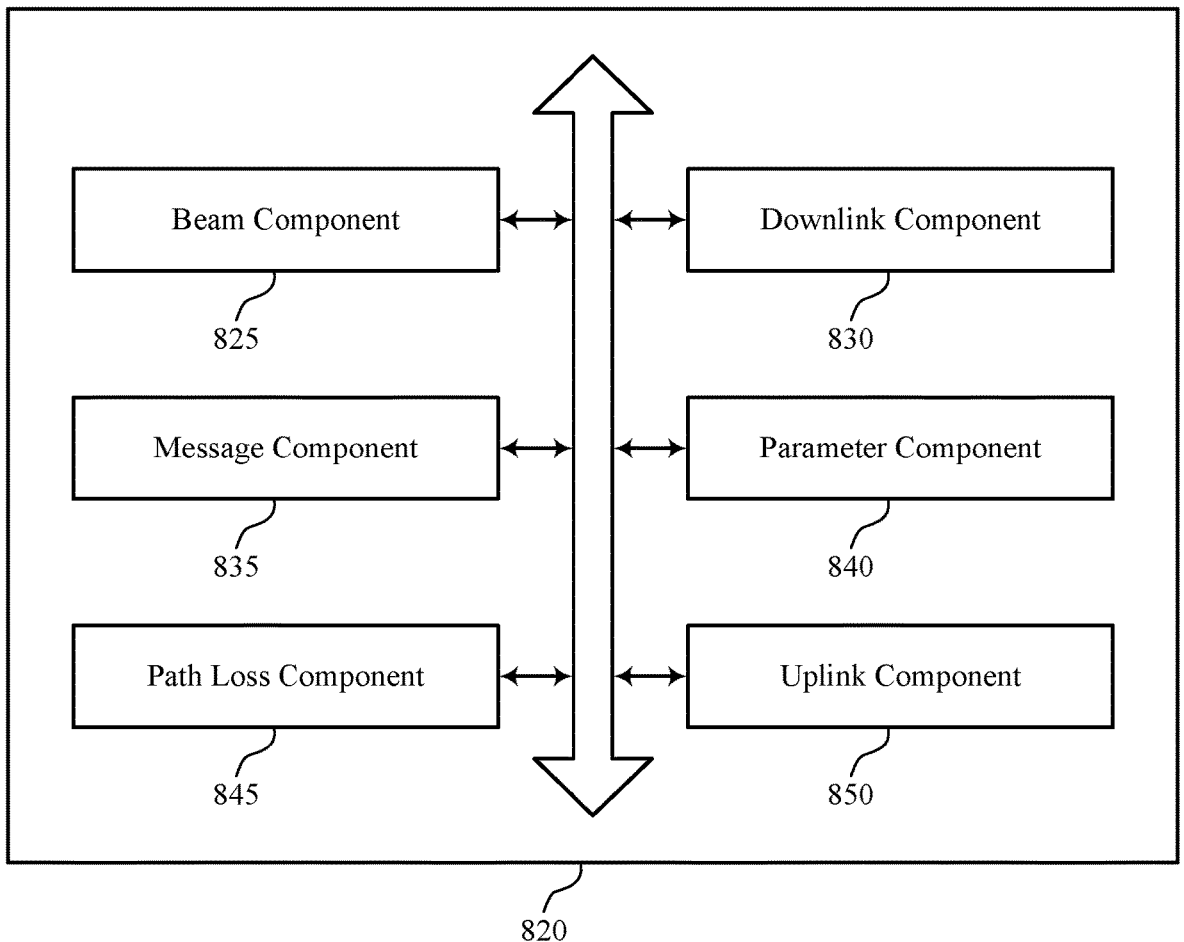
FIG. 8 shows a block diagram of a communications manager that supports a full duplex default beam for wireless communication in accordance with aspects of the present disclosure.

FIG. 8 shows a block diagram 800 of a communications manager 820 that supports a full duplex default beam for wireless communication in accordance with aspects of the present disclosure. The communications manager 820 may be an example of aspects of a communications manager 620, a communications manager 720, or both, as described herein. The communications manager 820, or various components thereof, may be an example of means for performing various aspects of a full duplex default beam for wireless communication as described herein. For example, the communications manager 820 may include a beam component 825, a downlink component 830, a message component 835, a parameter component 840, a path loss component 845, an uplink component 850, or any combination thereof. Each of these components may communicate, directly or indirectly, with one another (e.g., via one or more buses).

The communications manager 820 may support wireless communication at a UE in accordance with examples as disclosed herein. The beam component 825 may be configured as or otherwise support a means for selecting a default beam to use for downlink communication while operating in a full duplex mode. The downlink component 830 may be configured as or otherwise support a means for receiving the downlink communication based on the default beam. In some examples, the message component 835 may be configured as or otherwise support a means for receiving control signaling indicating the default beam for the UE to use for downlink communication while operating in a full duplex mode.

In some examples, the beam component 825 may be configured as or otherwise support a means for selecting the default beam to use for the downlink communication while operating in the full duplex mode based on the control signaling indicating the default beam. In some examples, to support receiving the control signaling, the message component 835 may be configured as or otherwise support a means for receiving an RRC message indicating the default beam to use for the downlink communication while operating in the full duplex mode. In some examples, to support receiving the control signaling, the message component 835 may be configured as or otherwise support a means for receiving a MAC-CE updating the default beam to use for the downlink communication while operating in the full duplex mode. By receiving a MAC-CE updating the default beam to use for the downlink communication while operating in the full duplex mode, the UE may support techniques for more efficient utilization of communication resources.

In some examples, to support receiving the control signaling, the beam component 825 may be configured as or otherwise support a means for receiving an indication of a default beam pair to use for one or more of the downlink communication or uplink communication while operating in the full duplex mode. The default beam pair including a default downlink beam and a default uplink beam. In some examples, to support receiving the control signaling, the downlink component 830 may be configured as or otherwise support a means for receiving the downlink communication based on the default beam pair. In some examples, the beam component 825 may be configured as or otherwise support a means for selecting the default beam pair to use for the downlink communication and the uplink communication while operating in the full duplex mode based on an absence of a TCI state in one or more symbols associated with the full duplex mode. In some examples, the message component 835 may be configured as or otherwise support a means for receiving a DCI including a DCI field including a bit indicating to enable or disable the default beam pair. In some examples, the message component 835 may be configured as or otherwise support a means for receiving a DCI indicating the same TCI states as the default beam pair associated with the downlink communication and the uplink communication. By receiving a DCI including a DCI field including a bit indicating to enable or disable the default beam pair, the UE may support techniques for lower latency and more efficient utilization of communication resources.

In some examples, to support receiving the control signaling, the parameter component 840 may be configured as or otherwise support a means for receiving a second indication of one or more power control parameters associated with the default beam pair. In some examples, to support receiving the control signaling, the downlink component 830 may be configured as or otherwise support a means for receiving the downlink communication based on the one or more power control parameters. In some examples, the one or more power control parameters includes a nominal power parameter, a power factor parameter, or a closed-loop index parameter.

In some examples, the path loss component 845 may be configured as or otherwise support a means for determining a path loss reference signal identifier associated with one or more uplink channels for the uplink communication based on the control signaling. In some examples, the uplink component 850 may be configured as or otherwise support a means for transmitting the uplink communication based on the path loss reference signal identifier associated with the one or more uplink channels for the uplink communication in the full duplex mode. In some examples, the path loss component 845 may be configured as or otherwise support a means for determining a path loss reference signal identifier associated with one or more uplink channels for the uplink communication based on an uplink TCI state or an uplink spatial relation information associated with the default beam pair. In some examples, the uplink component 850 may be configured as or otherwise support a means for transmitting the uplink communication based on the path loss reference signal identifier associated with the one or more uplink channels for the uplink communication in the full duplex mode.

In some examples, the beam component 825 may be configured as or otherwise support a means for selecting the default beam for the downlink communication based on a first duration being less than a second duration, the first duration corresponding to a first period between receiving a physical downlink control channel (PDCCH) to receiving a PDSCH, the second duration corresponding to a second period between receiving the PDCCH and applying spatial quasi-colocation (QCL) information for the PDSCH. In some examples, the beam component 825 may be configured as or otherwise support a means for determining the default beam to use for the downlink communication while operating in the full duplex mode based on a CORESET identifier of a set of multiple CORESET identifiers associated with the full duplex mode. In some examples, the downlink component 830 may be configured as or otherwise support a means for receiving the downlink communication using the default beam based on the determining. In some examples, the set of multiple CORESET identifiers associated with the full duplex mode are different than a respective set of multiple CORESET identifiers associated with a half duplex mode. In some examples, receiving the downlink communication using the default beam is based on that the CORESET is configured for a component carrier associated with the default beam.

In some examples, the message component 835 may be configured as or otherwise support a means for receiving a DCI, where the DCI excludes one or more of a downlink TCI state or an uplink TCI state while operating in the full duplex mode. In some examples, the default beam to use for the downlink communication while operating in the full duplex mode is different than a default beam to use for the downlink communication while operating in a half duplex mode. In some examples, the default beam corresponds to a lowest or a highest control resource set identifier of a set of CORESET identifiers.

Figure 9:
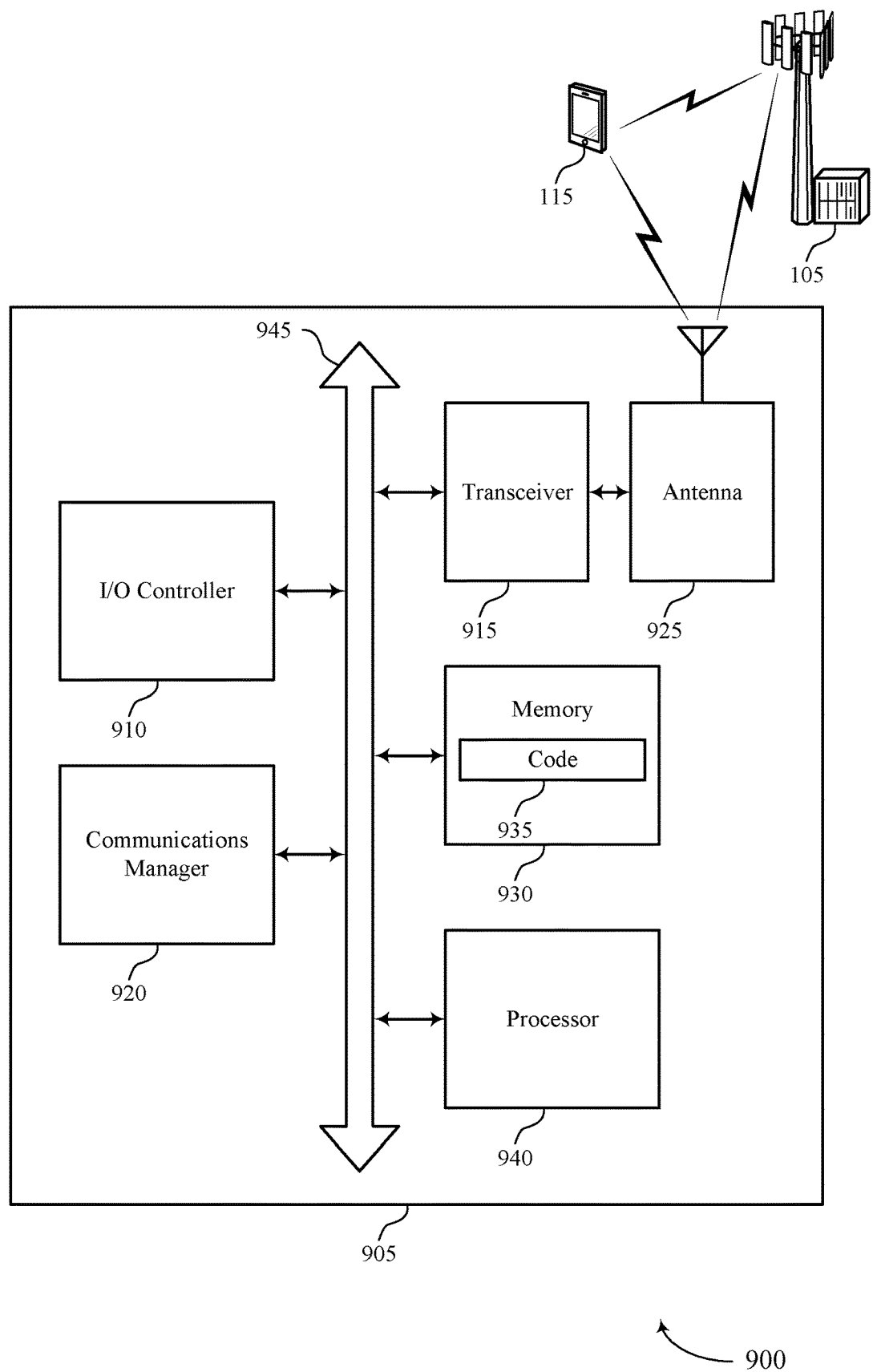
FIG. 9 shows a diagram of a system including a device that supports a full duplex default beam for wireless communication in accordance with aspects of the present disclosure.

FIG. 9 shows a diagram of a system 900 including a device 905 that supports a full duplex default beam for wireless communication in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting a full duplex default beam for wireless communication). For example, the device 905 or a component of the device 905 may include a processor 940 and memory 930 coupled to the processor 940, the processor 940 and memory 930 configured to perform various functions described herein.

The communications manager 920 may support wireless communication at the device 905 (e.g., a UE) in accordance with examples as disclosed herein. For example, the communications manager 920 may be configured as or otherwise support a means for selecting a default beam to use for downlink communication while operating in a full duplex mode. The communications manager 920 may be configured as or otherwise support a means for receiving the downlink communication based on the default beam. By including or configuring the communications manager 920 in accordance with examples as described herein, the device 905 may support techniques for improved communication reliability and reduced latency by enabling the device 905 to perform wireless communication using a default beam while operating in a full duplex mode.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of a full duplex default beam for wireless communication as described herein, or the processor 940 and the memory 930 may be otherwise configured to perform or support such operations.

Figure 10:
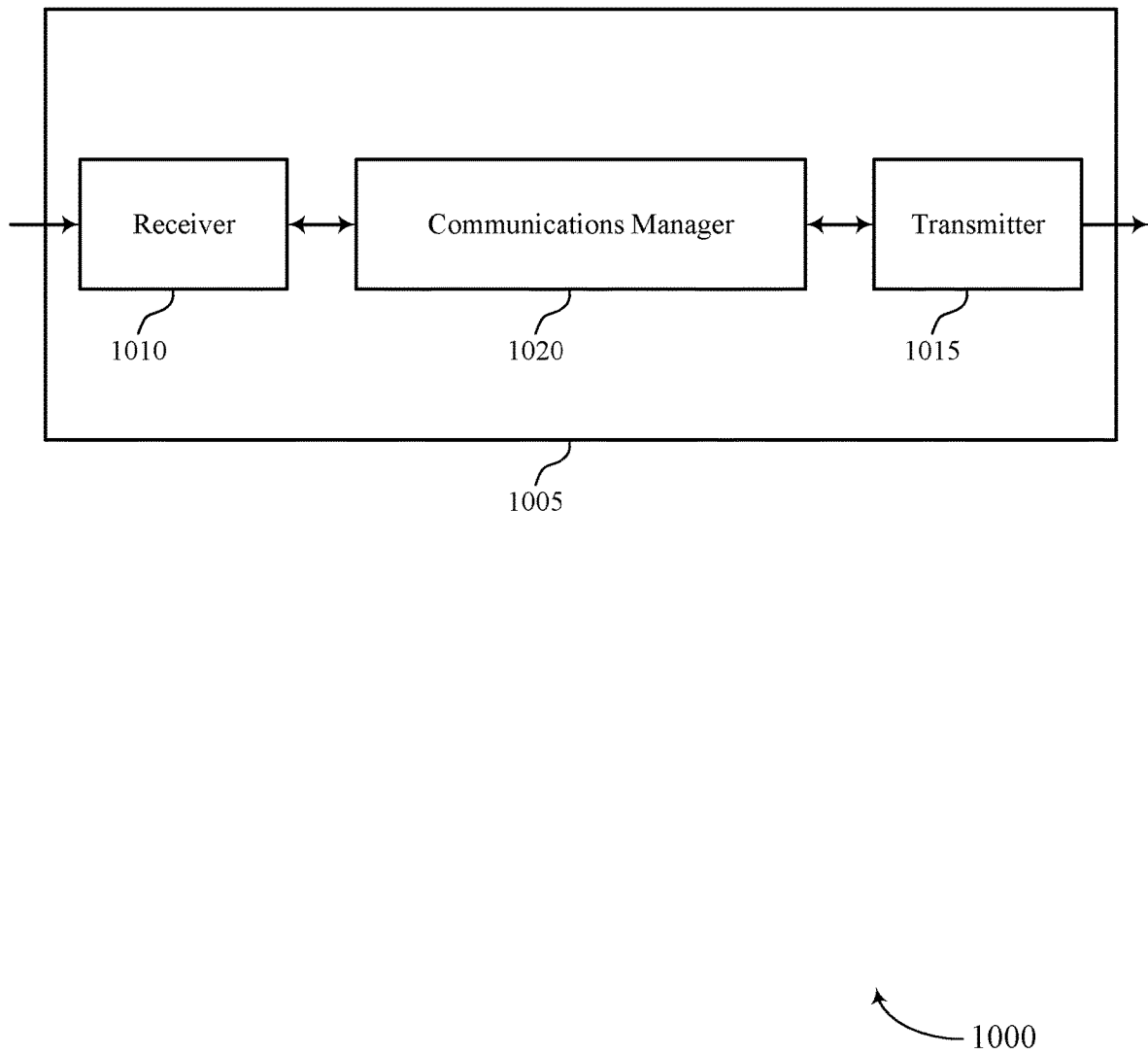
FIGS. 10 and 11 show block diagrams of devices that support a full duplex default beam for wireless communication in accordance with aspects of the present disclosure.

FIG. 10 shows a block diagram 1000 of a device 1005 that supports a full duplex default beam for wireless communication in accordance with aspects of the present disclosure. The device 1005 may be an example of aspects of a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to a full duplex default beam for wireless communication). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to a full duplex default beam for wireless communication). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of a full duplex default beam for wireless communication as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at the device 1005 (e.g., a base station) in accordance with examples as disclosed herein. For example, the communications manager 1020 may be configured as or otherwise support a means for selecting a default beam for a UE to use for downlink communication while operating in a full duplex mode. The communications manager 1020 may be configured as or otherwise support a means for transmitting control signaling indicating the default beam for the UE to use for downlink communication. The communications manager 1020 may be configured as or otherwise support a means for transmitting the downlink communication to the UE based on transmitting the control signaling indicating the default beam. By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for more efficient utilization of communication resources.

Figure 11:
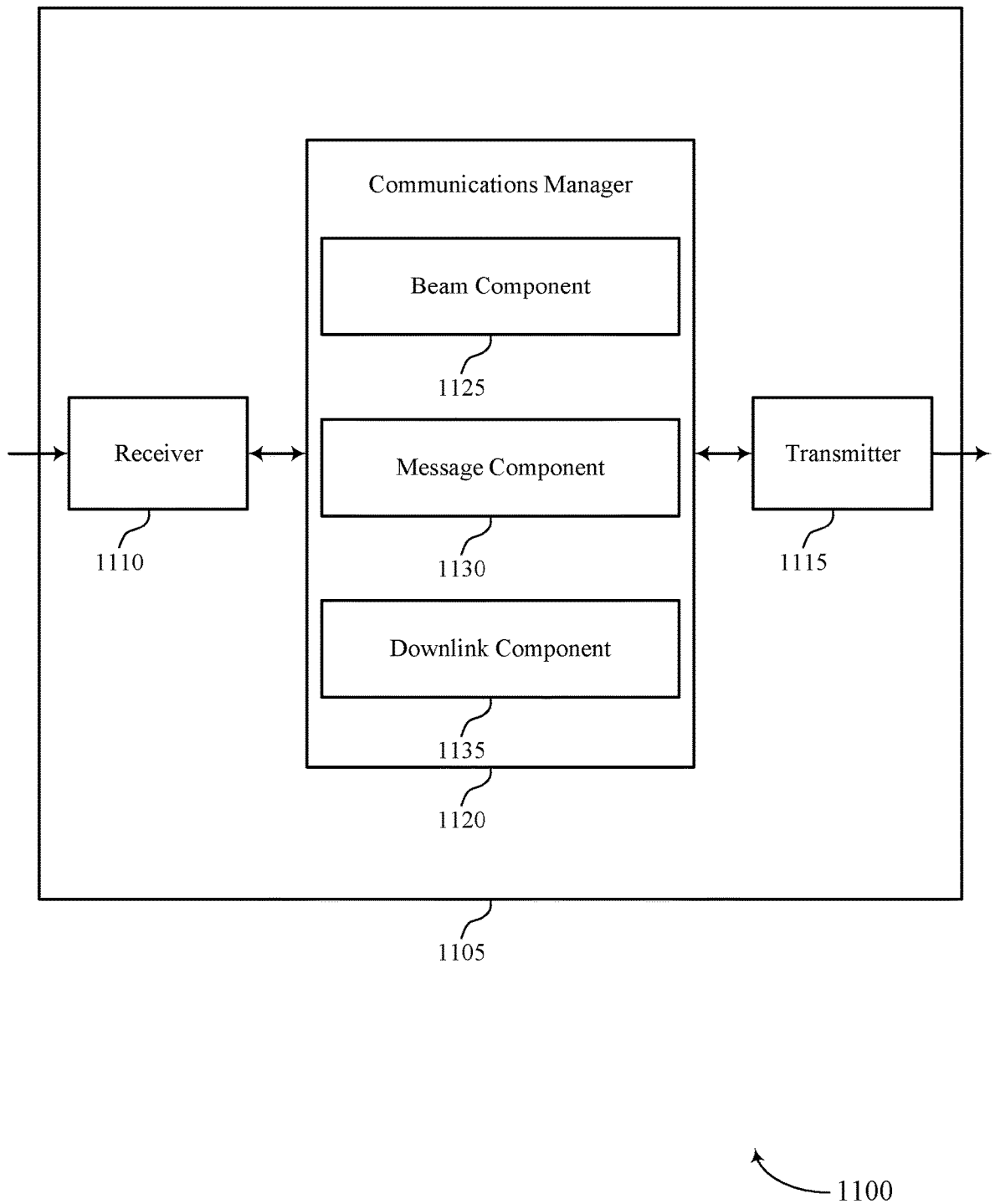

FIG. 11 shows a block diagram 1100 of a device 1105 that supports a full duplex default beam for wireless communication in accordance with aspects of the present disclosure. The device 1105 may be an example of aspects of a device 1005 or a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to a full duplex default beam for wireless communication). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to a full duplex default beam for wireless communication). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of a full duplex default beam for wireless communication as described herein. For example, the communications manager 1120 may include a beam component 1125, a message component 1130, a downlink component 1135, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at the device 1105 (e.g., a base station) in accordance with examples as disclosed herein. The beam component 1125 may be configured as or otherwise support a means for selecting a default beam for a UE to use for downlink communication while operating in a full duplex mode. The message component 1130 may be configured as or otherwise support a means for transmitting control signaling indicating the default beam for the UE to use for downlink communication. The downlink component 1135 may be configured as or otherwise support a means for transmitting the downlink communication to the UE based on transmitting the control signaling indicating the default beam.

Figure 12:
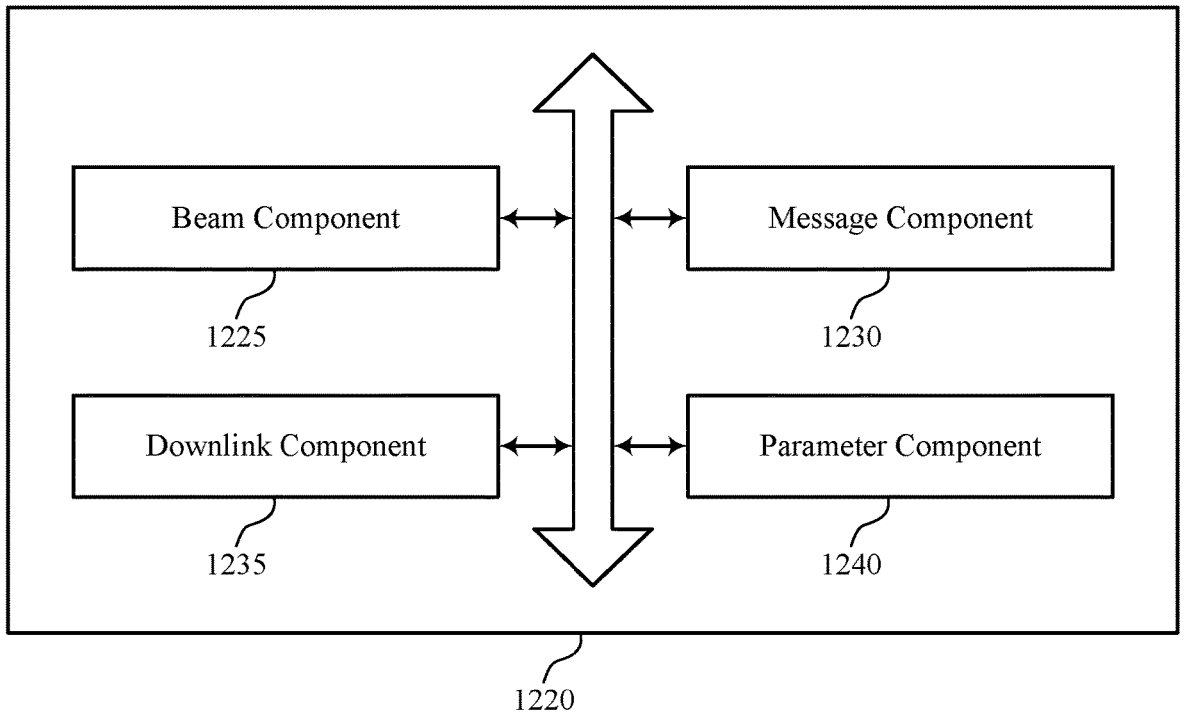
FIG. 12 shows a block diagram of a communications manager that supports a full duplex default beam for wireless communication in accordance with aspects of the present disclosure.

FIG. 12 shows a block diagram 1200 of a communications manager 1220 that supports a full duplex default beam for wireless communication in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of a full duplex default beam for wireless communication as described herein. For example, the communications manager 1220 may include a beam component 1225, a message component 1230, a downlink component 1235, a parameter component 1240, or any combination thereof. Each of these components may communicate, directly or indirectly, with one another (e.g., via one or more buses).

The communications manager 1220 may support wireless communication at a base station in accordance with examples as disclosed herein. The beam component 1225 may be configured as or otherwise support a means for selecting a default beam for a UE to use for downlink communication while operating in a full duplex mode. The message component 1230 may be configured as or otherwise support a means for transmitting control signaling indicating the default beam for the UE to use for downlink communication. The downlink component 1235 may be configured as or otherwise support a means for transmitting the downlink communication to the UE based on transmitting the control signaling indicating the default beam.

In some examples, the message component 1230 may be configured as or otherwise support a means for transmitting a DCI indicating a beam for the UE to use for the downlink communication while operating in the full duplex mode. In some examples, the downlink component 1235 may be configured as or otherwise support a means for transmitting the downlink communication to the UE based on the default beam indicated in the control signaling or the beam indicated in the DCI. In some examples, to support transmitting the control signaling, the message component 1230 may be configured as or otherwise support a means for transmitting an RRC message indicating the default beam for the UE to use for the downlink communication while operating in the full duplex mode.

In some examples, to support transmitting the control signaling, the message component 1230 may be configured as or otherwise support a means for transmitting a MAC-CE updating the default beam for the UE to use for the downlink communication while operating in the full duplex mode. In some examples, to support transmitting the control signaling, the beam component 1225 may be configured as or otherwise support a means for transmitting an indication of a default beam pair for the UE to use for one or more of the downlink communication or uplink communication while operating in the full duplex mode, the default beam pair including a default downlink beam and a default uplink beam. In some examples, to support transmitting the control signaling, the downlink component 1235 may be configured as or otherwise support a means for transmitting the downlink communication based on the default beam pair.

In some examples, the message component 1230 may be configured as or otherwise support a means for transmitting a DCI, the DCI excludes one or more of a downlink TCI state or an uplink TCI state. In some examples, the message component 1230 may be configured as or otherwise support a means for transmitting a DCI, the DCI includes a DCI field including a bit indicating to enable or disable the default beam pair. In some examples, the message component 1230 may be configured as or otherwise support a means for transmitting a DCI, the DCI associated with the default beam pair indicates the same TCI states as the default beam pair associated with the downlink communication and the uplink communication. In some examples, the parameter component 1240 may be configured as or otherwise support a means for transmitting a second indication of one or more power control parameters associated with the default beam pair. In some examples, the downlink component 1235 may be configured as or otherwise support a means for transmitting the downlink communication based on the one or more power control parameters.

Figure 13:
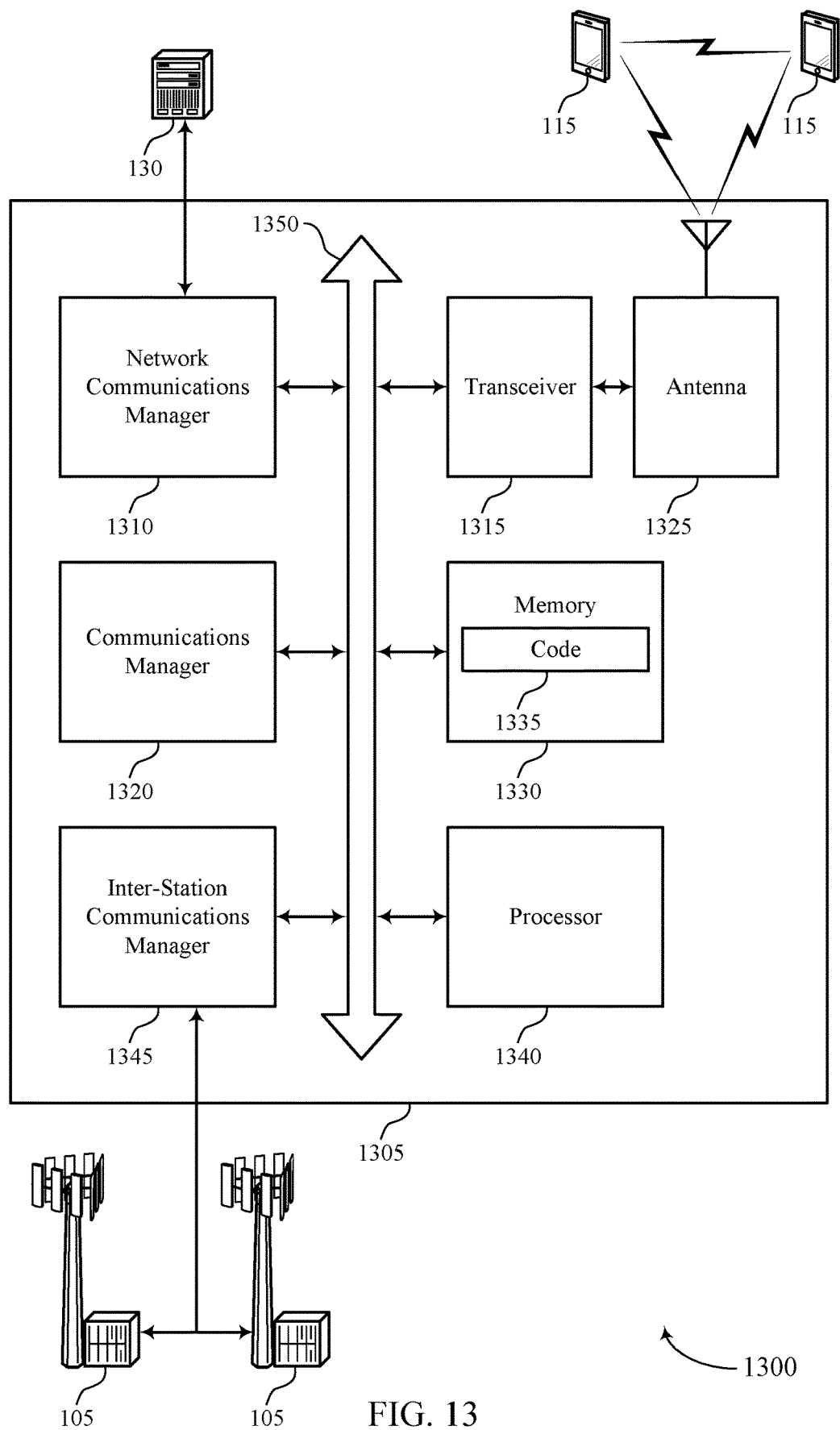
FIG. 13 shows a diagram of a system including a device that supports a full duplex default beam for wireless communication in accordance with aspects of the present disclosure.

FIG. 13 shows a diagram of a system 1300 including a device 1305 that supports a full duplex default beam for wireless communication in accordance with aspects of the present disclosure. The device 1305 may be an example of or include the components of a device 1005, a device 1105, or a base station 105 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (e.g., operatively, communicatively, functionally, electronically, electrically) via one or more buses (e.g., a bus 1350).

The network communications manager 1310 may manage communications with a core network 130 (e.g., via one or more wired backhaul links). For example, the network communications manager 1310 may manage the transfer of data communications for client devices, such as one or more UEs 115.

In some cases, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting a full duplex default beam for wireless communication). For example, the device 1305 or a component of the device 1305 may include a processor 1340 and memory 1330 coupled to the processor 1340, the processor 1340 and memory 1330 configured to perform various functions described herein.

The inter-station communications manager 1345 may manage communications with other base stations 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between base stations 105.

The communications manager 1320 may support wireless communication at the device 1305 (e.g., a base station) in accordance with examples as disclosed herein. For example, the communications manager 1320 may be configured as or otherwise support a means for selecting a default beam for a UE to use for downlink communication while operating in a full duplex mode. The communications manager 1320 may be configured as or otherwise support a means for transmitting control signaling indicating the default beam for the UE to use for downlink communication. The communications manager 1320 may be configured as or otherwise support a means for transmitting the downlink communication to the UE based on transmitting the control signaling indicating the default beam. By including or configuring the communications manager 1320 in accordance with examples as described herein, the device 1305 may support techniques for improved communication reliability and reduced latency by selecting and signaling to a UE a default beam for the UE to use for downlink communication while operating in a full duplex mode.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of a full duplex default beam for wireless communication as described herein, or the processor 1340 and the memory 1330 may be otherwise configured to perform or support such operations.

Figure 14:
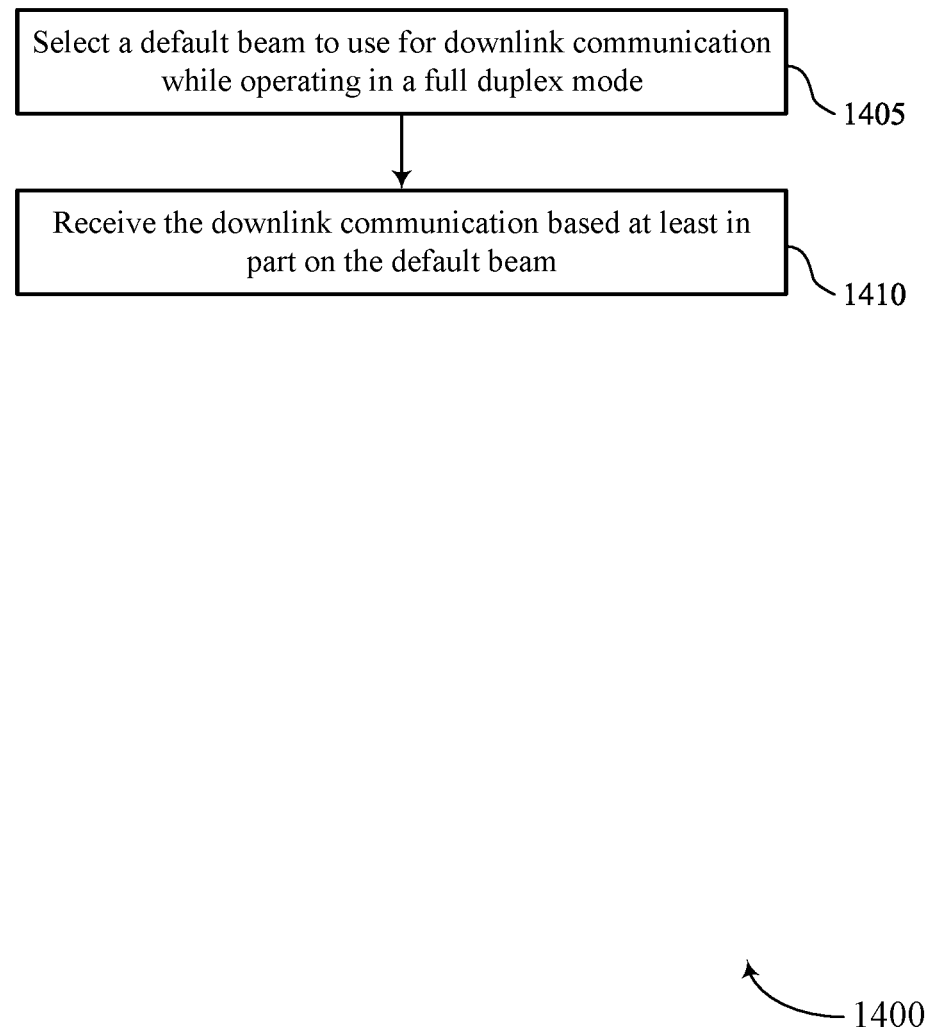
FIGS. 14 through 16 show flowcharts illustrating methods that support a full duplex default beam for wireless communication in accordance with aspects of the present disclosure.

FIG. 14 shows a flowchart illustrating a method 1400 that supports a full duplex default beam for wireless communication in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1405, the method may include selecting a default beam to use for downlink communication while operating in a full duplex mode. The operations of 1405 may be performed in accordance with examples as disclosed herein. In some examples, aspects of the operations of 1405 may be performed by a beam component 825 as described with reference to FIG. 8.

At 1410, the method may include receiving the downlink communication based on the default beam. The operations of 1410 may be performed in accordance with examples as disclosed herein. In some examples, aspects of the operations of 1410 may be performed by a downlink component 830 as described with reference to FIG. 8.

Figure 15:
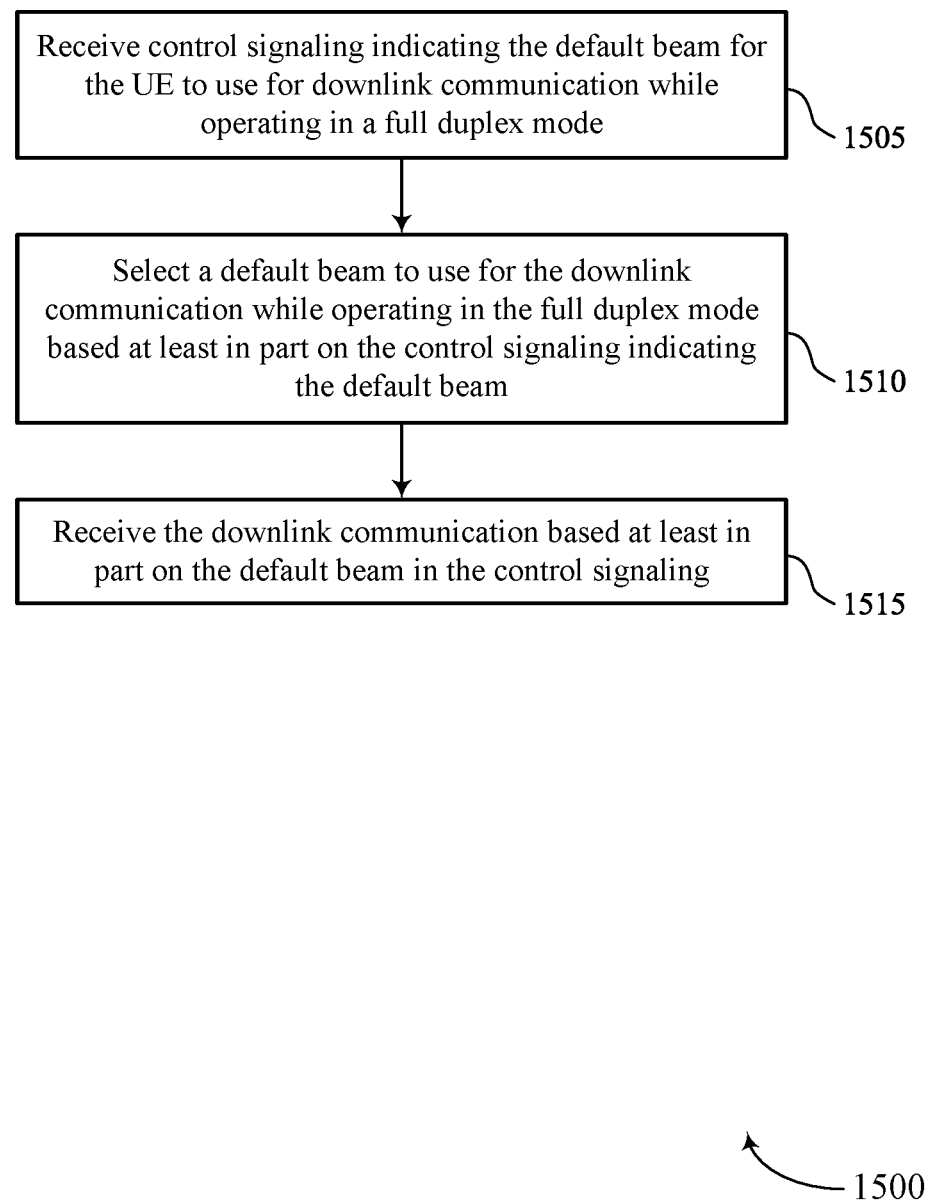

FIG. 15 shows a flowchart illustrating a method 1500 that supports a full duplex default beam for wireless communication in accordance with aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1505, the method may include receiving control signaling indicating the default beam for the UE to use for downlink communication while operating in a full duplex mode. The operations of 1505 may be performed in accordance with examples as disclosed herein. In some examples, aspects of the operations of 1505 may be performed by a message component 835 as described with reference to FIG. 8.

At 1510, the method may include selecting a default beam to use for the downlink communication while operating in the full duplex mode based at least in part on the control signaling indicating the default beam. The operations of 1510 may be performed in accordance with examples as disclosed herein. In some examples, aspects of the operations of 1510 may be performed by a beam component 825 as described with reference to FIG. 8.

At 1515, the method may include receiving the downlink communication based on the default beam in the control signaling. The operations of 1515 may be performed in accordance with examples as disclosed herein. In some examples, aspects of the operations of 1515 may be performed by a downlink component 830 as described with reference to FIG. 8.

Figure 16:
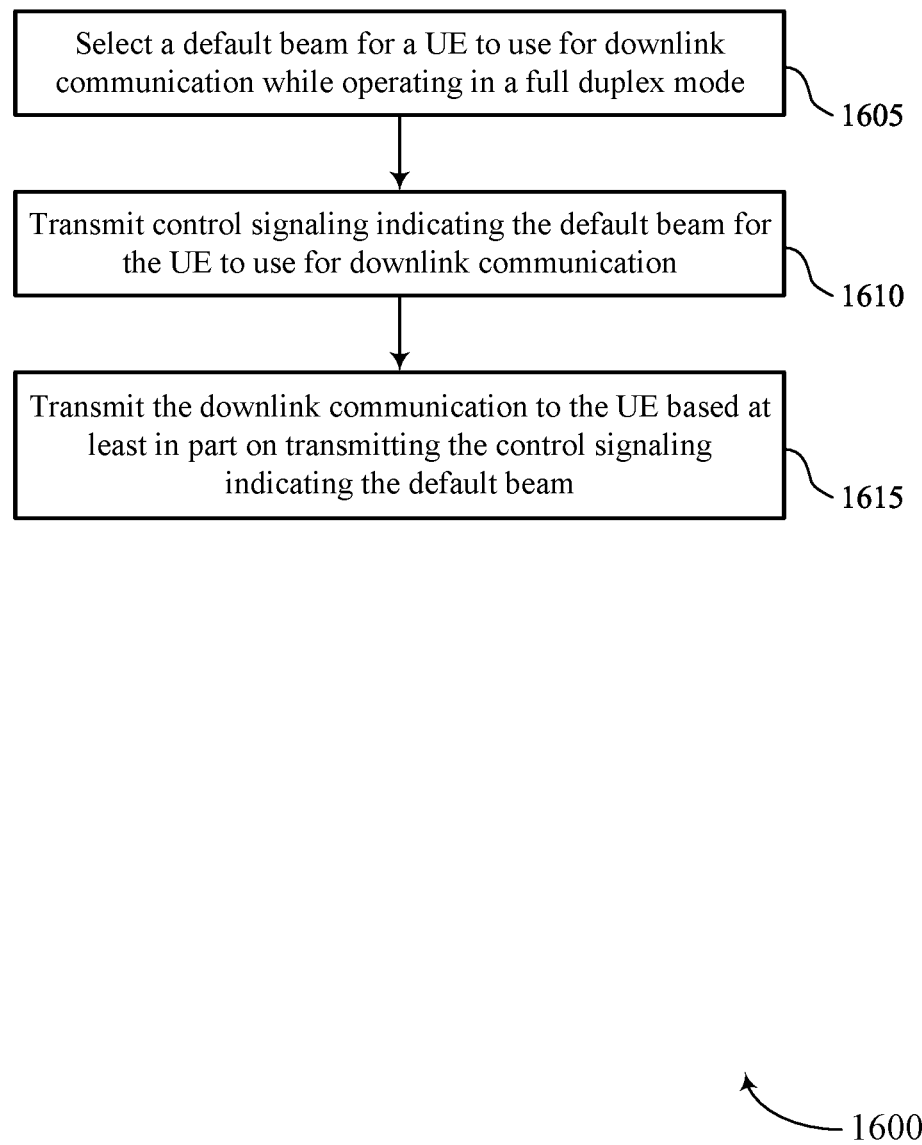

FIG. 16 shows a flowchart illustrating a method 1600 that supports a full duplex default beam for wireless communication in accordance with aspects of the present disclosure. The operations of the method 1600 may be implemented by a base station or its components as described herein. For example, the operations of the method 1600 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1605, the method may include selecting a default beam for a UE to use for downlink communication while operating in a full duplex mode. The operations of 1605 may be performed in accordance with examples as disclosed herein. In some examples, aspects of the operations of 1605 may be performed by a beam component 1225 as described with reference to FIG. 12.

At 1610, the method may include transmitting control signaling indicating the default beam for the UE to use for downlink communication. The operations of 1610 may be performed in accordance with examples as disclosed herein. In some examples, aspects of the operations of 1610 may be performed by a message component 1230 as described with reference to FIG. 12.

At 1615, the method may include transmitting the downlink communication to the UE based on transmitting the control signaling indicating the default beam. The operations of 1615 may be performed in accordance with examples as disclosed herein. In some examples, aspects of the operations of 1615 may be performed by a downlink component 1235 as described with reference to FIG. 12.

The following provides an overview of aspects of the present disclosure:

Aspect 1: A method for wireless communication at a UE, comprising: selecting a default beam to use for downlink communication while operating in a full duplex mode; and receiving the downlink communication based at least in part on the default beam in the control signaling.

Aspect 2: The method of aspect 1, further comprising: receiving control signaling indicating the default beam for the UE to use for downlink communication while operating in a full duplex mode, wherein selecting the default beam to use for the downlink communication while operating in the full duplex mode is based at least in part on the control signaling indicating the default beam.

Aspect 3: The method of aspect 2, wherein receiving the control signaling comprises: receiving an RRC message indicating the default beam to use for the downlink communication while operating in the full duplex mode.

Aspect 4: The method of any of aspects 2 through 3, wherein receiving the control signaling comprises: receiving a MAC-CE updating the default beam to use for the downlink communication while operating in the full duplex mode.

Aspect 5: The method of any of aspects 2 through 4, wherein receiving the control signaling comprises: receiving an indication of a default beam pair to use for one or more of the downlink communication or uplink communication while operating in the full duplex mode, the default beam pair comprising a default downlink beam and a default uplink beam, wherein receiving the downlink communication is based at least in part on the default beam pair.

Aspect 6: The method of aspect 5, further comprising: selecting the default beam pair to use for the downlink communication and the uplink communication while operating in the full duplex mode based at least in part on an absence of a TCI state in one or more symbols associated with the full duplex mode.

Aspect 7: The method of any of aspects 5 through 6, further comprising: receiving a DCI comprising a DCI field including a bit indicating to enable or disable the default beam pair.

Aspect 8: The method of any of aspects 5 through 7, further comprising: receiving a DCI indicating the same TCI states as the default beam pair associated with the downlink communication and the uplink communication.

Aspect 9: The method of any of aspects 5 through 8, wherein receiving the control signaling comprises: receiving a second indication of one or more power control parameters associated with the default beam pair, wherein receiving the downlink communication is based at least in part on the one or more power control parameters.

Aspect 10: The method of aspect 9, wherein the one or more power control parameters comprises a nominal power parameter, a power factor parameter, or a closed-loop index parameter.

Aspect 11: The method of aspect 10, further comprising: determining a path loss reference signal identifier associated with one or more uplink channels for the uplink communication based at least in part on the control signaling, wherein transmitting the uplink communication is based at least in part on the path loss reference signal identifier associated with the one or more uplink channels for the uplink communication in the full duplex mode.

Aspect 12: The method of any of aspects 10 through 11, further comprising: determining a path loss reference signal identifier associated with one or more uplink channels for the uplink communication based at least in part on an uplink TCI state or an uplink spatial relation information associated with the default beam pair, wherein transmitting the uplink communication is based at least in part on the path loss reference signal identifier associated with the one or more uplink channels for the uplink communication in the full duplex mode.

Aspect 13: The method of any of aspects 1 through 12, further comprising: selecting the default beam for the downlink communication based at least in part on a first duration being less than a second duration, the first duration corresponding to a first period between receiving a PDCCH to receiving a PDSCH, the second duration corresponding to a second period between receiving the PDCCH and applying spatial QCL information for the PDSCH.

Aspect 14: The method of any of aspects 1 through 13, further comprising: determining the default beam to use for the downlink communication while operating in the full duplex mode based at least in part on a CORESET identifier of a plurality of CORESET identifiers associated with the full duplex mode, wherein receiving the downlink communication using the default beam is based at least in part on the determining.

Aspect 15: The method of aspect 14, wherein the plurality of CORESET identifiers associated with the full duplex mode are different than a respective plurality of CORESET identifiers associated with a half duplex mode.

Aspect 16: The method of any of aspects 14 through 15, wherein receiving the downlink communication using the default beam is based at least in part on that the CORESET is configured for a component carrier associated with the default beam.

Aspect 17: The method of any of aspects 1 through 16, further comprising: receiving a DCI, wherein the DCI excludes one or more of a downlink TCI state or an uplink TCI state while operating in the full duplex mode.

Aspect 18: The method of any of aspects 1 through 17, wherein the default beam to use for the downlink communication while operating in the full duplex mode is different than a default beam to use for the downlink communication while operating in a half duplex mode.

Aspect 19: The method of aspect 18, wherein the default beam corresponds to a lowest or a highest CORESET identifier of a set of CORESET identifiers.

Aspect 20: A method for wireless communication at a base station, comprising: selecting a default beam for a UE to use for downlink communication while operating in a full duplex mode; transmitting control signaling indicating the default beam for the UE to use for downlink communication; and transmitting the downlink communication to the UE based at least in part on transmitting the control signaling indicating the default beam.

Aspect 21: The method of aspect 20, further comprising: transmitting a DCI indicating a beam for the UE to use for the downlink communication while operating in the full duplex mode, wherein transmitting the downlink communication to the UE is based at least in part on the default beam indicated in the control signaling or the beam indicated in the DCI.

Aspect 22: The method of any of aspects 20 through 21, wherein transmitting the control signaling comprises: transmitting an RRC message indicating the default beam for the UE to use for the downlink communication while operating in the full duplex mode.

Aspect 23: The method of any of aspects 20 through 22, wherein transmitting the control signaling comprises: transmitting a MAC-CE updating the default beam for the UE to use for the downlink communication while operating in the full duplex mode.

Aspect 24: The method of any of aspects 20 through 23, wherein transmitting the control signaling comprises: transmitting an indication of a default beam pair for the UE to use for one or more of the downlink communication or uplink communication while operating in the full duplex mode, the default beam pair comprising a default downlink beam and a default uplink beam, wherein transmitting the downlink communication is based at least in part on the default beam pair.

Aspect 25: The method of aspect 24, further comprising: transmitting a DCI, the DCI excludes one or more of a downlink TCI state or an uplink TCI state.

Aspect 26: The method of any of aspects 24 through 25, further comprising: transmitting a DCI, the DCI comprises a DCI field including a bit indicating to enable or disable the default beam pair.

Aspect 27: The method of any of aspects 24 through 26, further comprising: transmitting a DCI, the DCI associated with the default beam pair indicates the same TCI states as the default beam pair associated with the downlink communication and the uplink communication.

Aspect 28: The method of any of aspects 24 through 27, further comprising: transmitting a second indication of one or more power control parameters associated with the default beam pair, wherein transmitting the downlink communication is based at least in part on the one or more power control parameters.

Aspect 29: An apparatus for wireless communication at a UE, comprising a processor; memory coupled with the processor; and instructions stored in the memory and executable by the processor to cause the apparatus to perform a method of any of aspects 1 through 19.

Aspect 30: An apparatus for wireless communication at a UE, comprising at least one means for performing a method of any of aspects 1 through 19.

Aspect 31: A non-transitory computer-readable medium storing code for wireless communication at a UE, the code comprising instructions executable by a processor to perform a method of any of aspects 1 through 19.

Aspect 32: An apparatus for wireless communication at a base station, comprising a processor; memory coupled with the processor; and instructions stored in the memory and executable by the processor to cause the apparatus to perform a method of any of aspects 20 through 28.

Aspect 33: An apparatus for wireless communication at a base station, comprising at least one means for performing a method of any of aspects 20 through 28.

Aspect 34: A non-transitory computer-readable medium storing code for wireless communication at a base station, the code comprising instructions executable by a processor to perform a method of any of aspects 20 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
    selecting a first default beam to use for downlink communication while operating in a full duplex mode, the first default beam different from a second default beam, the second default beam to use for downlink communication while operating in a half duplex mode; and
    receiving the downlink communication based at least in part on the first default beam.

2. The method of claim 1, further comprising:
    receiving control signaling indicating the first default beam for the UE to use for downlink communication while operating in the full duplex mode,
    wherein selecting the first default beam to use for the downlink communication while operating in the full duplex mode is based at least in part on the control signaling indicating the first default beam.

3. The method of claim 2, wherein receiving the control signaling comprises:
    receiving a radio resource control message indicating the first default beam to use for the downlink communication while operating in the full duplex mode.

4. The method of claim 2, wherein receiving the control signaling comprises:
    receiving a medium access control-control element updating the first default beam to use for the downlink communication while operating in the full duplex mode.

5. The method of claim 2, wherein receiving the control signaling comprises:
    receiving an indication of a default beam pair to use for one or more of the downlink communication or uplink communication while operating in the full duplex mode, the default beam pair comprising a default downlink beam and a default uplink beam,
    wherein receiving the downlink communication is based at least in part on the default beam pair.

6. The method of claim 5, further comprising:
    selecting the default beam pair to use for the downlink communication and the uplink communication while operating in the full duplex mode based at least in part on an absence of a transmission configuration indicator state in one or more symbols associated with the full duplex mode.

7. The method of claim 5, further comprising:
    receiving a downlink control information comprising a downlink control information field including a bit indicating to enable or disable the default beam pair.

8. The method of claim 5, further comprising:
receiving a downlink control information indicating the same transmission configuration indicator states as the default beam pair associated with the downlink communication and the uplink communication.

9. The method of claim 5, wherein receiving the control signaling comprises:
receiving a second indication of one or more power control parameters associated with the default beam pair,
wherein receiving the downlink communication is based at least in part on the one or more power control parameters.

10. The method of claim 9, wherein the one or more power control parameters comprises a nominal power parameter, a power factor parameter, or a closed-loop index parameter.

11. The method of claim 10, further comprising:
determining a path loss reference signal identifier associated with one or more uplink channels for the uplink communication based at least in part on the control signaling,
wherein transmitting the uplink communication is based at least in part on the path loss reference signal identifier associated with the one or more uplink channels for the uplink communication in the full duplex mode.

12. The method of claim 10, further comprising:
determining a path loss reference signal identifier associated with one or more uplink channels for the uplink communication based at least in part on an uplink transmission configuration indicator state or an uplink spatial relation information associated with the default beam pair,
wherein transmitting the uplink communication is based at least in part on the path loss reference signal identifier associated with the one or more uplink channels for the uplink communication in the full duplex mode.

13. The method of claim 1, further comprising:
selecting the first default beam for the downlink communication based at least in part on a first duration being less than a second duration, the first duration corresponding to a first period between receiving a physical downlink control channel to receiving a physical downlink shared channel, the second duration corresponding to a second period between receiving the physical downlink control channel and applying spatial quasi-colocation information for the physical downlink shared channel.

14. The method of claim 1, further comprising:
determining the first default beam to use for the downlink communication while operating in the full duplex mode based at least in part on a control resource set identifier of a plurality of control resource set identifiers associated with the full duplex mode,
wherein receiving the downlink communication using the first default beam is based at least in part on the determining.

15. The method of claim 14, wherein the plurality of control resource set identifiers associated with the full duplex mode are different from a respective plurality of control resource set identifiers associated with a half duplex mode.

16. The method of claim 14, wherein receiving the downlink communication using the first default beam is based at least in part on that the control resource set is configured for a component carrier associated with the first default beam.

17. The method of claim 1, further comprising:
receiving a downlink control information, wherein the downlink control information excludes one or more of a downlink transmission configuration indicator state or an uplink transmission configuration indicator state while operating in the full duplex mode.

18. The method of claim 1, wherein the first default beam corresponds to a lowest or a highest control resource set identifier of a set of control resource set identifiers.

19. A method for wireless communication at a base station, comprising:
selecting a first default beam for a user equipment (UE) to use for downlink communication while operating in a full duplex mode, the first default beam different from a second default beam, the second default beam to use for downlink communication while operating in a half duplex mode;
transmitting control signaling indicating the first default beam for the UE to use for downlink communication; and
transmitting the downlink communication to the UE based at least in part on transmitting the control signaling indicating the first default beam.

20. The method of claim 19, further comprising:
transmitting a downlink control information indicating a beam for the UE to use for the downlink communication while operating in the full duplex mode,
wherein transmitting the downlink communication to the UE is based at least in part on the first default beam indicated in the control signaling or the beam indicated in the downlink control information.

21. The method of claim 19, wherein transmitting the control signaling comprises:
transmitting a radio resource control message indicating the first default beam for the UE to use for the downlink communication while operating in the full duplex mode.

22. The method of claim 19, wherein transmitting the control signaling comprises:
transmitting a medium access control-control element updating the first default beam for the UE to use for the downlink communication while operating in the full duplex mode.

23. The method of claim 19, wherein transmitting the control signaling comprises:
transmitting an indication of a default beam pair for the UE to use for one or more of the downlink communication or uplink communication while operating in the full duplex mode, the default beam pair comprising a default downlink beam and a default uplink beam,
wherein transmitting the downlink communication is based at least in part on the default beam pair.

24. The method of claim 23, further comprising:
transmitting a downlink control information, the downlink control information excludes one or more of a downlink transmission configuration indicator state or an uplink transmission configuration indicator state.

25. The method of claim 23, further comprising:
transmitting a downlink control information, the downlink control information comprises a downlink control information field including a bit indicating to enable or disable the default beam pair.

26. The method of claim 23, further comprising:
transmitting a downlink control information, the downlink control information associated with the default beam pair indicates the same transmission configuration indicator states as the default beam pair associated with the downlink communication and the uplink communication.

27. The method of claim 23, further comprising:
transmitting a second indication of one or more power control parameters associated with the default beam pair,
wherein transmitting the downlink communication is based at least in part on the one or more power control parameters.

28. An apparatus for wireless communication at a user equipment (UE), comprising:
a processor;
memory coupled with the processor; and
instructions stored in the memory and executable by the processor to cause the apparatus to:
select a first default beam to use for downlink communication while operating in a full duplex mode, the first default beam different from a second default beam, the second default beam to use for downlink communication while operating in a half duplex mode; and
receive the downlink communication based at least in part on the first default beam.

29. An apparatus for wireless communication at a base station, comprising:
a processor;
memory coupled with the processor; and
instructions stored in the memory and executable by the processor to cause the apparatus to:
select a first default beam for a user equipment (UE) to use for downlink communication while operating in a full duplex mode, the first default beam different from a second default beam, the second default beam to use for downlink communication while operating in a half duplex mode;
transmit control signaling indicating the first default beam for the UE to use for downlink communication; and
transmit the downlink communication to the UE based at least in part on transmitting the control signaling indicating the first default beam.

* * * * *